United States Patent
Yong et al.

(10) Patent No.: US 12,316,985 B2
(45) Date of Patent: May 27, 2025

(54) IMAGE SENSOR INCLUDING IMAGE SIGNAL PROCESSOR AND OPERATING METHOD OF THE IMAGE SENSOR

(71) Applicant: Samsung Electronics Co., Ltd., Suwon-si (KR)

(72) Inventors: Eunji Yong, Seoul (KR); Kundong Kim, Seongnam-si (KR); Heeshin Kim, Hwaseong-si (KR); Kichrl Park, Hwaseong-si (KR); Dongyoung Song, Yongin-si (KR); Sangwoo Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/825,521

(22) Filed: May 26, 2022

(65) Prior Publication Data
US 2022/0385841 A1   Dec. 1, 2022

(30) Foreign Application Priority Data

May 28, 2021 (KR) .......................... 10-2021-0069530
Sep. 9, 2021 (KR) .......................... 10-2021-0120528

(51) Int. Cl.
*H04N 25/60* (2023.01)
*G06T 5/70* (2024.01)
(Continued)

(52) U.S. Cl.
CPC ............. *H04N 25/60* (2023.01); *G06T 5/70* (2024.01); *H04N 23/81* (2023.01); *H04N 23/843* (2023.01); *H04N 25/75* (2023.01)

(58) Field of Classification Search
None
See application file for complete search history.

(56) References Cited

U.S. PATENT DOCUMENTS

| | | | |
|---|---|---|---|
| 8,433,155 B2 | 4/2013 | Kempf et al. | |
| 8,508,612 B2 | 8/2013 | Cote et al. | |
| (Continued) | | | |

FOREIGN PATENT DOCUMENTS

| | | | |
|---|---|---|---|
| KR | 100575443 | | 5/2006 |
| RU | 0002298223 C2 | | 4/2007 |

OTHER PUBLICATIONS

Title: Normal Distribution Date: Feb. 19, 2011 URL: https://web.archive.org/web/20110219121350/https://en.wikipedia.org/wiki/Normal_distribution (Year: 2011).*

(Continued)

*Primary Examiner* — Twyler L Haskins
*Assistant Examiner* — Wesley J Chiu
(74) *Attorney, Agent, or Firm* — Harness, Dickey & Pierce, P.L.C.

(57) ABSTRACT

An image sensor including an image signal processor and an operating method of the image sensor are provided. An image sensor may include a pixel array configured to convert a received optical signal into electrical signals, a readout circuit configured to analog-digital convert the electrical signals to generate image data, and an image signal processor configured to perform one-dimensional filtering in each of a first direction and a second direction on the image data to remove noise of the image data, the second direction being different than the first direction.

14 Claims, 25 Drawing Sheets

(51) Int. Cl.
    *H04N 23/81*    (2023.01)
    *H04N 23/84*    (2023.01)
    *H04N 25/75*    (2023.01)

(56) References Cited

U.S. PATENT DOCUMENTS

| | | | |
|---|---|---|---|
| 9,137,452 B2 | 9/2015 | Han | |
| 10,187,656 B2 | 1/2019 | Yang et al. | |
| 10,694,129 B2 | 6/2020 | Cote et al. | |
| 2006/0133689 A1* | 6/2006 | Andersson | H04N 19/182 375/E7.176 |
| 2008/0240602 A1* | 10/2008 | Adams | G06T 5/003 382/266 |
| 2008/0260291 A1 | 10/2008 | Alakarhu et al. | |
| 2010/0045820 A1* | 2/2010 | Prieto | H04N 23/81 348/229.1 |
| 2010/0259650 A1* | 10/2010 | Sasaki | G06V 10/758 348/241 |
| 2011/0081087 A1* | 4/2011 | Moore | G06V 20/40 382/199 |
| 2011/0090371 A1* | 4/2011 | Cote | H04N 25/683 348/E9.053 |
| 2013/0182968 A1* | 7/2013 | Adams | G06T 5/002 382/264 |
| 2013/0201401 A1* | 8/2013 | Hirooka | H04N 25/60 348/607 |
| 2014/0253808 A1* | 9/2014 | Tachi | H04N 9/64 348/624 |
| 2015/0062384 A1* | 3/2015 | Tanaka | H04N 5/2621 348/240.2 |
| 2019/0246138 A1* | 8/2019 | Terterov | H04N 19/137 |

OTHER PUBLICATIONS

Extended European Search Report dated Nov. 11, 2022 (corresponding to EP 22175784.2).

* cited by examiner

<Horizontal Direction Filtering>

<Vertical Direction Filtering>

IMAGE SENSOR INCLUDING IMAGE SIGNAL PROCESSOR AND OPERATING METHOD OF THE IMAGE SENSOR

CROSS-REFERENCE TO RELATED APPLICATIONS

This application is based on and claims priority under 35 U.S.C. § 119 to Korean Patent Application Nos. 10-2021-0069530, filed on May 28, 2021, and 10-2021-0120528, filed on Sep. 9, 2021, in the Korean Intellectual Property Office, the disclosures of which are incorporated by reference herein in their entirety.

BACKGROUND

The inventive concepts relate to image signal processing, and more particularly, to an image sensor including an image signal processor for performing one-dimensional filtering and an operating method of the image sensor.

Image sensors are devices which capture a two-dimensional or three-dimensional image of an object. Image sensors generate an image of an object by using a photoelectric conversion device which reacts based on the strength of light reflected from an object. Recently, as complementary metal-oxide semiconductor (CMOS) technology advances, CMOS image sensors using CMOS are being widely used. Because images sensors are equipped in various devices, it is required to increase resolution and enhance image quality, and thus, image sensors are needed where a pixel size of a pixel array included in image sensors is reduced and image quality is enhanced.

SUMMARY

The inventive concepts provide an image sensor and an operating method thereof, which remove noise of image data with low power to provide image data having high image quality.

According to an aspect of the inventive concepts, there is provided an image sensor including a pixel array configured to convert a received optical signal into electrical signals, a readout circuit configured to analog-digital convert the electrical signals to generate image data, and an image signal processor configured to perform one-dimensional filtering in each of a first direction and a second direction on the image data to remove noise of the image data, the second direction being vertical to the first direction.

According to another aspect of the inventive concepts, there is provided an image sensor including a pixel array configured to convert a received optical signal into electrical signals, a readout circuit configured to analog-digital convert the electrical signals to generate image data, and a noise reduction logic configured to continuously perform one-dimensional filtering in a plurality of directions on the image data on the basis of a one-dimensional Gaussian filter set.

According to another aspect of the inventive concepts, there is provided an operating method of an image sensor including a signal processing processor, the operating method including generating image data on the basis of an optical signal received by a pixel array, performing, by the signal processing processor, one-dimensional filtering in a first direction on the image data on the basis of a first Gaussian filter, and performing, by the signal processing processor, one-dimensional filtering in a second direction on the image data on the basis of a second Gaussian filter, the second direction being vertical to the first direction.

According to another aspect of the inventive concepts, there is provided an image sensor including a pixel array configured to convert a received optical signal into electrical signals, a readout circuit configured to analog-digital convert the electrical signals to generate image data, a bad pixel correction logic configured to correct a pixel value of a bad pixel included in the image data, and a noise reduction logic configured to continuously perform one-dimensional filtering in a horizontal direction and a vertical direction on input image data on the basis of a one-dimensional Gaussian filter set.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
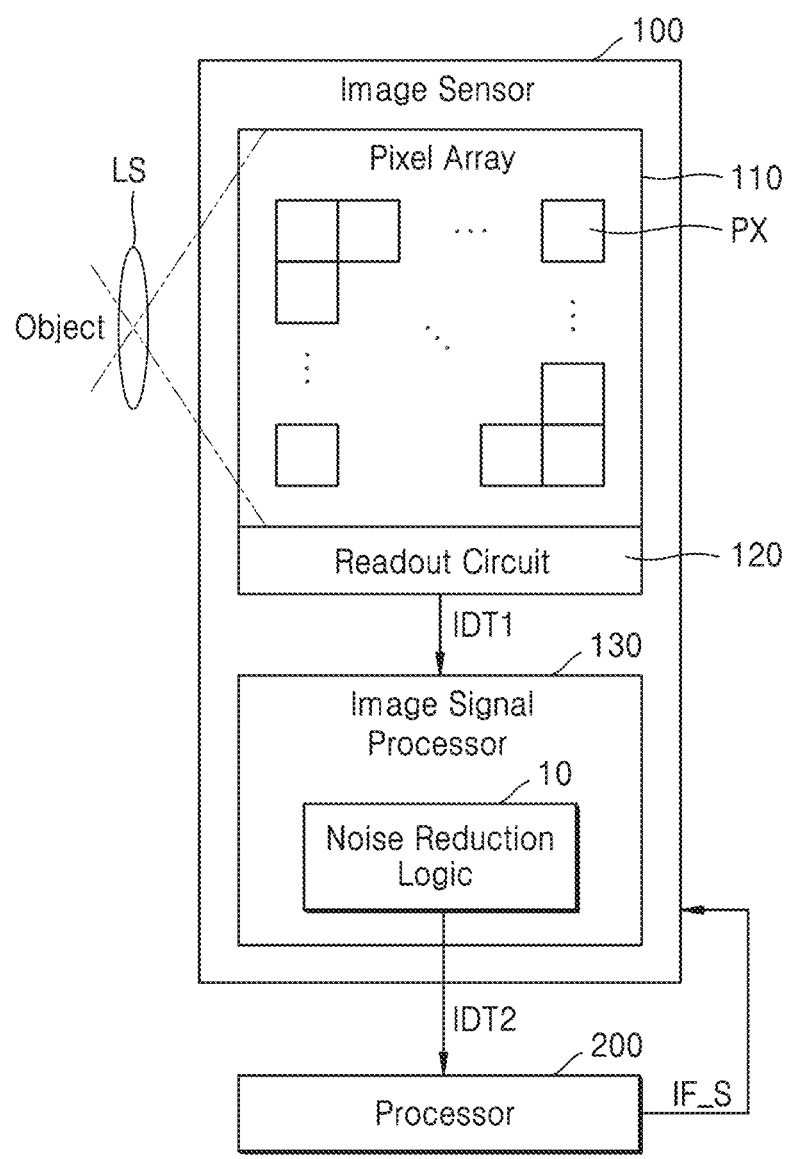
FIG. 1 is a block diagram illustrating an image sensor according to an embodiment.

FIG. 1 is a block diagram illustrating an image sensor 100 according to an embodiment.

The image sensor 100 may convert an optical signal of an object, incident through an optical lens LS, into image data. The image sensor 100 may be equipped in an electronic device having an image or light sensing function. For example, the image sensor 100 may be equipped in electronic devices such as digital still cameras, digital video cameras, smartphones, wearable devices, Internet of things (IoT) devices, tablet personal computers (PCs), personal digital assistants (PDAs), portable multimedia players (PMPs), and navigation devices. Also, the image sensor 100 may be equipped in an electronic device which is included as a part in vehicles, furniture, manufacturing facilities, doors, and various meters.

Referring to FIG. 1, the image sensor 100 may include a pixel array 110, a readout circuit 120, and/or an image signal processor 130. The image signal processor 130 may include a noise reduction logic 10. In an embodiment, the pixel array 110, the readout circuit 120, and the image signal processor 130 may be implemented as one semiconductor chip or semiconductor module. In an embodiment, the pixel array 110 and the readout circuit 120 may be implemented as one semiconductor chip, and the image signal processor 130 may be implemented as one semiconductor chip.

The pixel array 110 may be implemented as, for example, a photoelectric conversion device such as charge-coupled devices (CCD) or complementary metal-oxide semiconductor (CMOS), and moreover, may be implemented as various kinds of photoelectric conversion devices. The pixel array 110 may include a plurality of sensing pixels PXs, which convert a received optical signal (light) into an electrical signal, and the plurality of sensing pixels PXs may be arranged in a matrix. Each of the plurality of sensing pixels PXs may include a light sensing device. For example, the light sensing device may include a photodiode, an organic photodiode, a phototransistor, a photogate, or a pinned photodiode.

The readout circuit 120 may convert electrical signals, received from the pixel array 110, into image data. The readout circuit 120 may amplify the electrical signals and may analog-digital convert the amplified electrical signals. Image data generated by the readout circuit 120 may include a plurality of pixels respectively corresponding to the plurality of sensing pixels PXs of the pixel array 110. Here, the sensing pixel PXs of the pixel array 110 may be a physical structure which generates a signal based on received light, and a pixel included in the image data may represent data corresponding to the sensing pixel PXs. The readout circuit 120 may configure a sensing core along with the pixel array 110.

The image signal processor 130 may perform image processing on image data IDT1 (i.e., raw image data) output from the readout circuit 120. For example, the image signal processor 130 may perform image processing, such as bad pixel correction, remosaic, and noise removal, on the image data IDT1.

The image signal processor 130 may include the noise reduction logic 10, which reduces noise of image data. The noise reduction logic 10 may perform one-dimensional filtering on input image data to reduce noise of the image data. The image data may be the raw image data IDT1 output from the readout circuit 120, or may be image data on which other image processing has been performed by other processing logics included in the image signal processor 130.

In an embodiment, the noise reduction logic 10 may perform one-dimensional filtering on the image data on the basis of a one-dimensional filter. The one-dimensional filter may include N (where N is an integer of 3 or more) number of coefficients respectively applied to N number of pixels arranged in one direction among a plurality of pixels. The one-dimensional filter may be implemented as a Gaussian filter. Coefficient values of the N coefficients may have a Gaussian distribution. A value of a coefficient (hereinafter, referred to as a coefficient value) applied to a pixel (i.e., a filtering target pixel) (hereinafter, referred to as a target pixel) disposed at a center among the N pixels may be largest, and a coefficient value applied to a pixel may decrease as a corresponding pixel is farther away from a target pixel. In an embodiment, coefficient values may adaptively vary based on periphery illumination.

In an embodiment, the noise reduction logic 10 may perform one-dimensional filtering by pixel group units including pixels arranged in an M×M matrix (where M is an even number of two or more), and one-dimensional filtering may be performed on image data on the basis of $M^2$ number of one-dimensional filters (i.e., a one-dimensional filter set) set for each of the pixels.

In an embodiment, the noise reduction logic 10 may perform one-dimensional filtering on the image data in different directions a plurality of times. For example, the noise reduction logic 10 may perform one-dimensional filtering in a row direction and a column direction of the image data. However, the inventive concept is not limited thereto, and the noise reduction logic 10 may further perform one-dimensional filtering in a diagonal direction (for example, a direction from a left upper portion to a right lower portion and/or a reverse diagonal direction) of the image data.

In an embodiment, the noise reduction logic 10 may be implemented as hardware. However, the inventive concept is not limited thereto, and the noise reduction logic 10 may be implemented by software or a combination of hardware and firmware.

The image signal processor 130 may output converted image data IDT2 through image processing. The converted image data IDT2 may be provided to an external processor 200 (for example, a main processor, an application processor, a graphics processor, or the like of an electronic device equipped with the image sensor 100).

The external processor 200 may store the converted image data IDT2, or may display the converted image data IDT2 on a display device. The external processor 200 may perform image processing on the converted image data IDT2. In an embodiment, the external processor 200 may provide setting information IS_S to the image sensor 100. For example, the setting information IS_S may include various information, such as exposure information, an analog gain, a digital gain, and conversion gain setting information about a pixel, for setting the image sensor 200.

A size of the sensing pixel PXs included in the pixel array 110 is reduced as the image sensor 100 increases in resolution and is slimmed, and due to the miniaturization of the sensing pixel PXs, the image quality of image data may be degraded and noise (for example, salt and pepper noise, a color stain, and the like) may occur. Particularly, noise may severely occur in a low illumination environment where the amount of light incident on the pixel array 110 is low.

However, the image sensor 100 according to an embodiment may decrease noise of image data on the basis of a simple algorithm which performs one-dimensional filtering in a plurality of directions on the image data by using a one-dimensional Gaussian filter. Accordingly, the image sensor 100 according to an embodiment may prevent a degradation in image quality of image data with low power and may generate image data having high image quality even in a low illumination environment.

Figure 2:
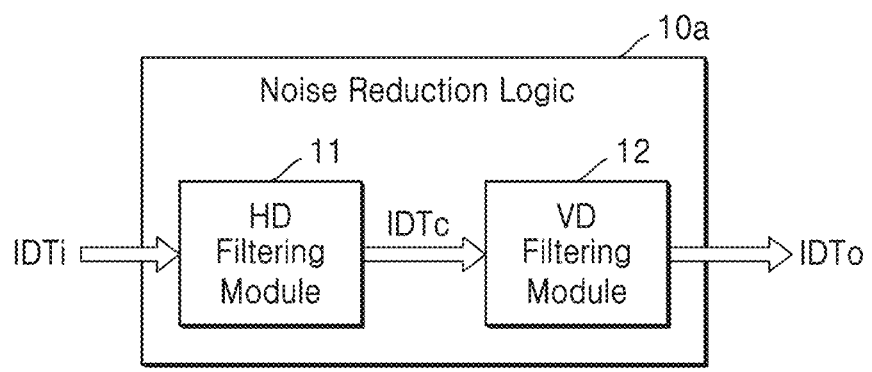
FIG. 2 illustrates an example of a noise reduction logic according to an embodiment.

FIG. 2 illustrates an example of a noise reduction logic 10a according to an embodiment. The noise reduction logic 10a of FIG. 2 may be applied as the noise reduction logic 10 of FIG. 1.

Referring to FIG. 2, the noise reduction logic 10a may include a first filtering module 11 and a second filtering module 12. In a non-limiting embodiment, the first filtering module 11 and the second filtering module 12 may be implemented as hardware.

The first filtering module 11 may perform one-dimensional filtering in a first direction on input image data IDTi on the basis of a first filter, and continuously, the second filtering module 12 may perform one-dimensional filtering in a second direction on image data IDTc output from the first filtering module 11 on the basis of a second filter to generate output image data IDTo.

In an embodiment, the first direction may be a horizontal direction (or referred to as a row direction) of the input image data IDTi, and the second direction may be a vertical direction (or referred to as a column direction) of the image data IDTc. In other words, the first filtering module 11 may be a horizontal direction HD filtering module, and the second filtering module 12 may be a vertical direction VD filtering module. The first filter and the second filter may each be a one-dimensional Gaussian filter, and the second filter may be the same as or different from the first filter.

In FIG. 2, the first filtering module 11 and the second filtering module 12 are illustrated as separate elements, but are not limited thereto and may be implemented as one module.

An example has been described where the noise reduction logic 10a includes the first filtering module 11 and the second filtering module 12 and continuously performs one-dimensional filtering in the horizontal direction and the vertical direction, but the inventive concept is not limited thereto. In an embodiment, the noise reduction logic 10a may further include one or more filtering modules (for example, a third filtering module and/or a fourth filtering module) which perform one-dimensional filtering in different directions.

As described above, the noise reduction logic 10a may continuously perform one-dimensional filtering on the image data IDTi in a plurality of directions to reduce noise of the image data IDTi.

Figure 3A:
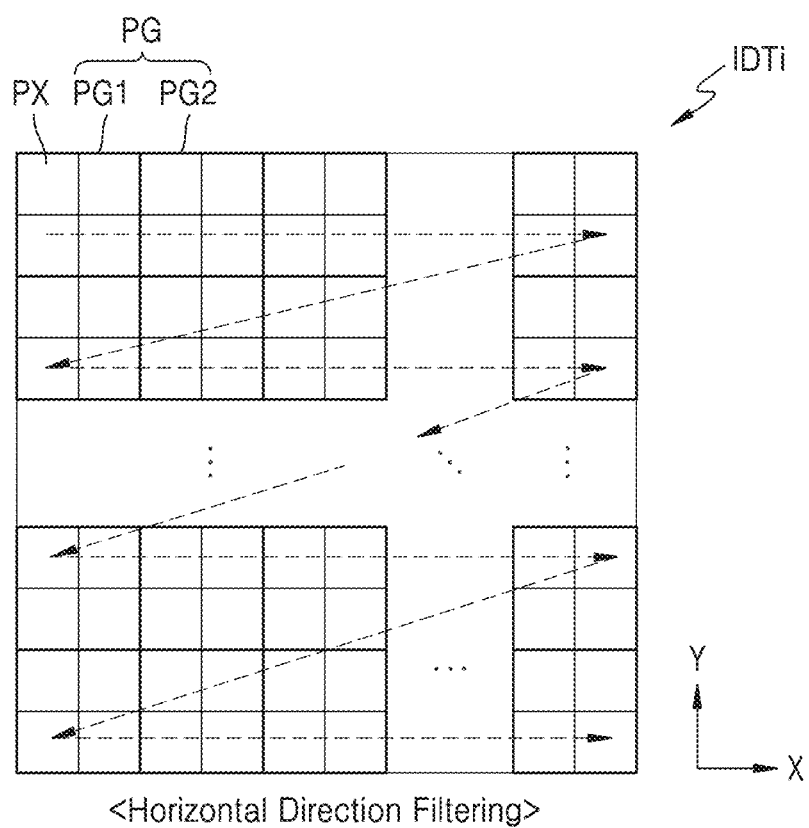
FIGS. 3A and 3B are diagrams illustrating a method of performing one-dimensional filtering on image data, according to an embodiment.
Figure 3B:
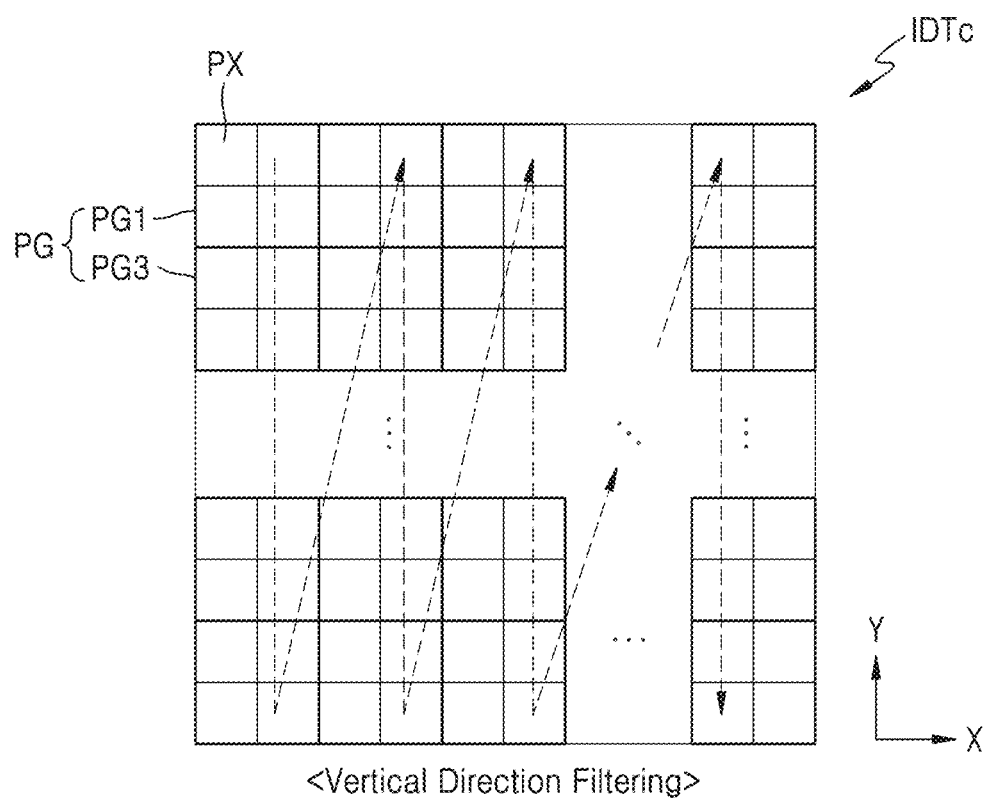
Figure 4A:
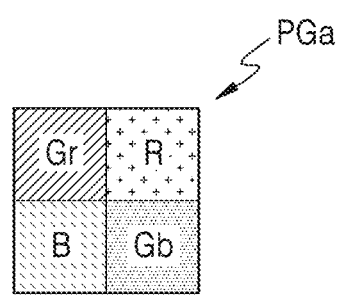
FIGS. 4A and 4B illustrate a pixel group of FIG. 3.
Figure 4B:
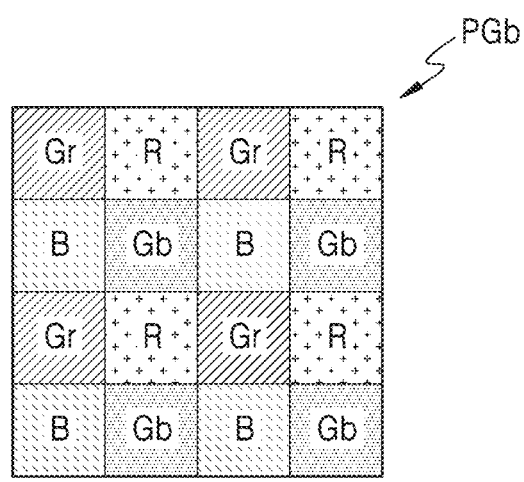

FIGS. 3A and 3B are diagrams illustrating a method of performing one-dimensional filtering on image data, according to an embodiment, and FIGS. 4A and 4B illustrate a pixel group of FIGS. 3A and 3B.

Referring to FIGS. 3A and 3B, pieces of image data IDTi and IDTc may each be two-dimensional data and may include a plurality of pixels PX arranged in a horizontal direction (for example, an X-axis direction) and a vertical direction (for example, a Y-axis direction). Each of the image data IDTi and IDTc may be divided into a plurality of pixel groups PG including pixels PX arranged in an M×M matrix (where M is an even number of 2 or more), and one-dimensional filtering may be performed by pixel group PG units.

As described above with reference to FIG. 1, the noise reduction logic 10 may perform one-dimensional filtering by pixel group PG units including $M^2$ number of pixels and may perform one-dimensional filtering on the basis of $M^2$ number of one-dimensional Gaussian filters (i.e., a one-dimensional Gaussian filter set) respectively applied to the $M^2$ pixels.

FIG. 3A illustrates one-dimensional filtering in the horizontal direction on the image data IDTi, and FIG. 3B illustrates one-dimensional filtering in the vertical direction on the image data IDTc. The first filtering module 11 of FIG. 2 may perform one-dimensional filtering in the horizontal direction on the basis of a first filter (for example, a one-dimensional Gaussian filter set), and the second filtering module 12 may perform one-dimensional filtering in the vertical direction on the basis of a second filter. However, the inventive concept is not limited thereto, and in an embodiment, the first filtering module 11 of FIG. 2 may perform one-dimensional filtering in the vertical direction and the second filtering module 12 may perform one-dimensional filtering in the horizontal direction.

Referring to FIGS. 4A and 4B, a pixel group (PG of FIG. 3) may have a Bayer pattern. The Bayer pattern may denote a pattern where green, red, and blue are alternately arranged so that green is 50%, red is 25%, and blue is 25%, on the basis of a visual characteristic of a person.

Referring to FIG. 4A, a pixel group PGa may be configured to have a 2×2 Bayer pattern. The pixel group PGa may include a first green pixel Gr, a red pixel R, a second green pixel Gb, and a blue pixel B, the first green pixel Gr and the second green pixel Gb may be arranged in a diagonal direction, and the red pixel R and the blue pixel B may be arranged in a diagonal direction.

Referring to FIG. 4B, a pixel group PGb may be configured to have a 4×4 Bayer pattern. The pixel group PGb may include four first green pixels Gr, four red pixels R, four second green pixels Gb, and four blue pixels B. In addition, a pixel group (PG of FIGS. 3A and 3B) may be configured to have a Bayer pattern having various sizes.

A pattern applied to the pixel group PG of FIGS. 3A and 3B has been described above with reference to FIGS. 4A and 4B. However, the inventive concept is not limited thereto, and one of various different patterns may be applied to the pixel group PG. For example, the pixel group PG may include an RGBW pattern, an RWB pattern, a YCbCr pattern, a CMY pattern, or a CMYG pattern.

Referring again to FIG. 3A, the first filtering module 11 may perform one-dimensional filtering in the horizontal direction on the input image data IDTi. The first filtering module 11 may perform one-dimensional filtering in the horizontal direction on one pixel group PG (for example, a first pixel group PG1) of a plurality of pixel groups PG, and then, may perform one-dimensional filtering in the horizontal direction on a different pixel group PG (for example, a second pixel group PG2) adjacent thereto in the horizontal direction. The first filtering module 11 may apply a corresponding one-dimensional Gaussian filter to each of pixels PX (for example, four pixels PX) included in the pixel group PG. A detailed method of performing one-dimensional filtering in the horizontal direction will be described in detail with reference to FIGS. 5A and 5B.

With respect a dotted-line direction illustrated, one-dimensional filtering in the horizontal direction may be sequentially performed on each of pixel groups PG arranged in the same row, and then, one-dimensional filtering in the horizontal direction may be sequentially performed on each of pixel groups PG arranged in a next row. In this manner, one-dimensional filtering in the horizontal direction may be performed on a plurality of pixel groups PG of the image data IDTi.

Referring to FIG. 3B, one-dimensional filtering in the vertical direction may be performed on the image data IDTi generated by performing one-dimensional filtering in the horizontal direction. The second filtering module 12 may perform one-dimensional filtering in the vertical direction on one pixel group PG (for example, the first pixel group PG1) of the plurality of pixel groups PG, and then, may perform one-dimensional filtering in the vertical direction on a different pixel group PG (for example, a third pixel group PG3) adjacent thereto in the vertical direction. The second filtering module 12 may apply a corresponding one-dimensional Gaussian filter to each of pixels PX (for example, four pixels PX) included in the pixel group PG. A detailed method of performing one-dimensional filtering in the vertical direction will be described in detail with reference to FIGS. 6A and 6B.

With respect a dashed-line direction illustrated, one-dimensional filtering in the vertical direction may be sequentially performed on each of pixel groups PG arranged in the same column, and then, one-dimensional filtering in the vertical direction may be sequentially performed on each of pixel groups PG arranged in a next column. In this manner, one-dimensional filtering in the vertical direction may be performed on a plurality of pixel groups PG of the image data IDTc.

In an embodiment, in a case where image processing is performed by the image signal processor 130, image data may be stored and updated in a line buffer in pixels PX by units of a plurality of rows, and image processing (for example, one-dimensional filtering in the horizontal direction and the vertical direction described above) may be continuously performed on a plurality of rows of the image data stored in the line buffer. As a plurality of rows are updated in the line buffer, one-dimensional filtering in the horizontal direction and the vertical direction may be continuously performed on a plurality of rows continuously updated.

Figure 5A:
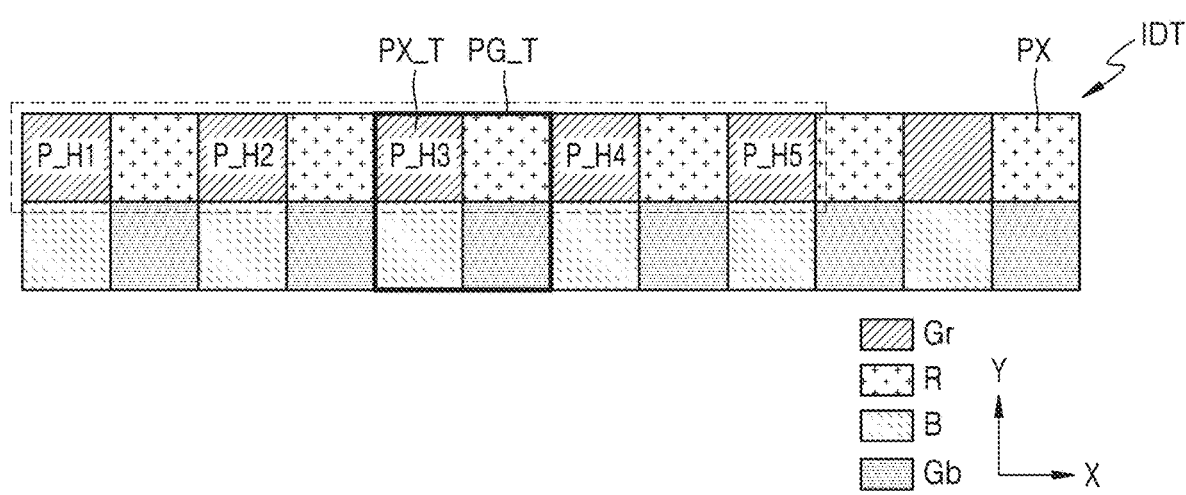
FIGS. 5A and 5B illustrate a method of performing one-dimensional filtering in a horizontal direction, according to an embodiment.
Figure 5B:
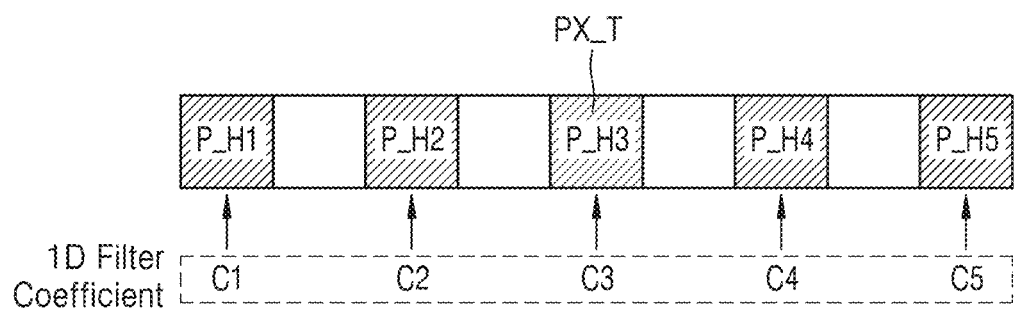

FIGS. 5A and 5B illustrate a method of performing one-dimensional filtering in a horizontal direction, according to an embodiment. FIGS. 5A and 5B may be performed by the first filtering module 11 of FIG. 2.

Referring to FIG. 5A, in performing one-dimensional filtering in a horizontal direction on image data IDT, peripheral pixels PX arranged in the same row as a target pixel group PG_T on which filtering is to be performed may be used. For example, N−1 number of first green pixels Gr arranged in the same row as a target pixel PX_T may be used for performing one-dimensional filtering in the horizontal direction on the first green pixel Gr (hereinafter, referred to as a target pixel PX_T) of the target pixel group PG_T. For example, the target pixel PX_T (for example, two first green pixels Gr (for example, a first pixel P_H1, a second pixel P_H2, a fourth pixel P_H4, and a fifth pixel P_H5) arranged at each of a left side and a right side of a third pixel P_H3) may be used.

Referring to FIG. 5B, a one-dimensional filter may include N number of coefficients respectively applied to N number of pixels including the target pixel PX_T. For example, the one-dimensional filter may include first to fifth coefficients C1 to C5, and the first to fifth coefficients C1 to C5 may each be applied to the target pixel PX_T (for example, a third pixel P_H3 and peripheral first pixel P_H1, second pixel P_H2, fourth pixel P_H4, and fifth pixel P_H5).

A pixel value of the target pixel PX_T may be converted based on one-dimensional filtering in the horizontal direction, and a converted pixel value PV_H may be calculated based on the following Equation 1.

$$PV\_H = \frac{\sum_{i=1}^{N} Ci * P\_Hi}{2^K} \quad \text{[Equation 1]}$$

Here, K may denote the number of bits representing a coefficient, and for example, in a case where a coefficient is expressed as 13 bits, the coefficient may have one of $2^{13}$ values (i.e., 8192 values), a minimum value of the coefficient may be "0", and a maximum value of the coefficient may be "8192".

For example, coefficient values of the first to fifth coefficients C1 to C5 may be multiplied by pixel values of the first to fifth pixels P_H1 to P_H5, and then, multiplied values may be summated. Subsequently, a maximum coefficient value (for example, a value divided as 8192) may be calculated as the converted pixel value PV_H of the target pixel PX_T.

Likewise, N−1 number of (for example, four) pixels PX having the same color disposed at a left side and a right side of the other pixels of the target pixel group PG_T may be used in one-dimensional filtering in the horizontal direction on each of the other pixels (for example, a red pixel R, a blue pixel B, and a second green pixel Gb) of the target pixel group PG_T.

As described above, different one-dimensional filters (for example, a one-dimensional Gaussian filter) may be respectively applied to a plurality of pixels (for example, a first green pixel Gr, a red pixel R, a blue pixel B, and a second green pixel Gb) of the target pixel group PG_T.

Figure 6A:
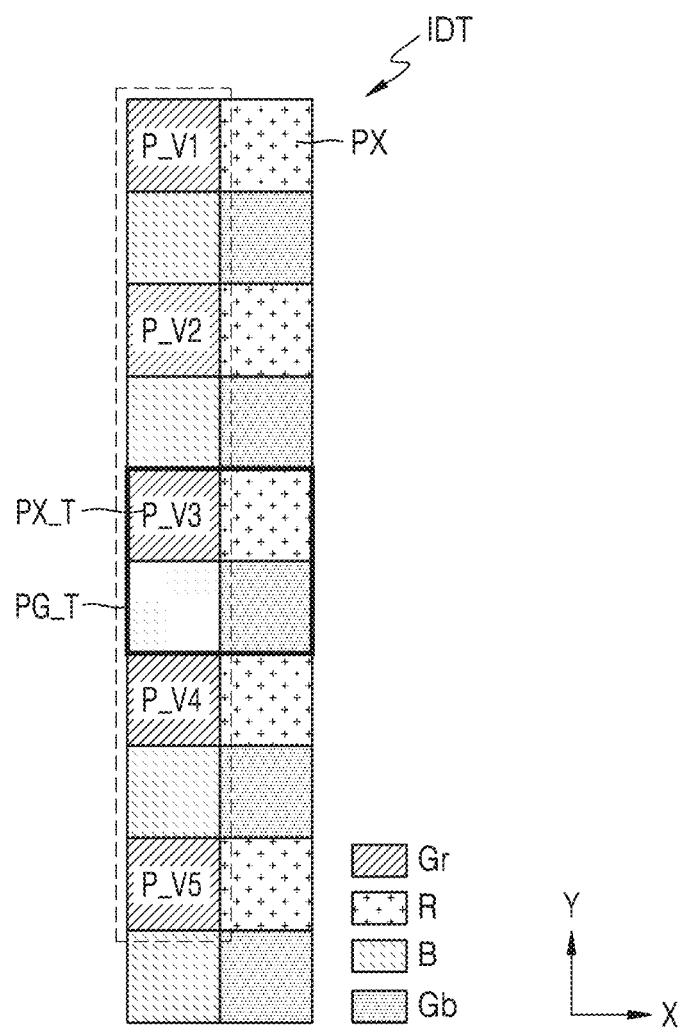
FIGS. 6A and 6B illustrate a method of performing one-dimensional filtering in a vertical direction, according to an embodiment.
Figure 6B:
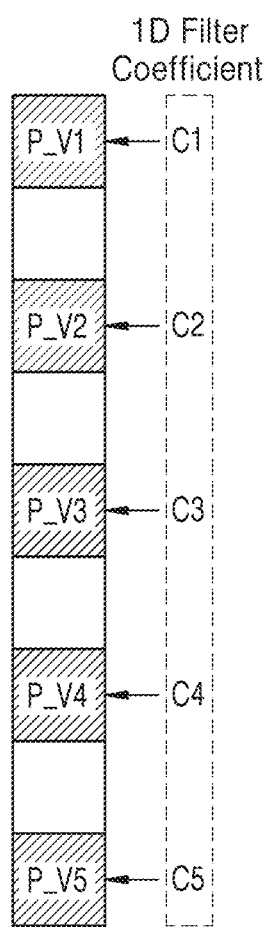

FIGS. 6A and 6B illustrate a method of performing one-dimensional filtering in a vertical direction, according to an embodiment. FIGS. 6A and 6B may be performed by the second filtering module 12 of FIG. 2.

Referring to FIG. 6A, in performing one-dimensional filtering in a vertical direction on image data IDT, peripheral pixels PX arranged in the same column as a target pixel group PG_T on which filtering is to be performed may be used. For example, N−1 number of first green pixels Gr arranged in the same column as a target pixel PX_T may be used for performing one-dimensional filtering in the vertical direction on the first green pixel Gr (hereinafter, referred to as a target pixel PX_T) of the target pixel group PG_T. For example, the target pixel PX_T (for example, two first green pixels Gr (for example, a first pixel P_V1, a second pixel P_V2, a fourth pixel P_V4, and a fifth pixel P_V5) arranged at each of an upper side and a lower side of a third pixel P_H3) may be used.

Referring to FIG. 6B, a one-dimensional filter may include N number of coefficients respectively applied to N number of pixels including the target pixel PX_T. For example, the one-dimensional filter may include first to fifth coefficients C1 to C5, and the first to fifth coefficients C1 to C5 may each be applied to the target pixel PX_T (for example, a third pixel P_V3 and peripheral first pixel P_V1, second pixel P_V2, fourth pixel P_V4, and fifth pixel P_V5).

Comparing with a one-dimensional filtering method in the horizontal direction in FIG. 5A, in performing one-dimensional filtering in a horizontal direction, the first to fifth coefficients C1 to C5 of a filter may be applied to first to fifth pixels P_H1 to P_H5 arranged in the horizontal direction, and in performing one-dimensional filtering in the vertical direction in FIG. 6B, the first to fifth coefficients C1 to C5 of a filter may be applied to first to fifth pixels P_V1 to P_V5 arranged in the vertical direction.

In an embodiment, a one-dimensional filter used in performing one-dimensional filtering in the vertical direction may be the same as a one-dimensional filter used in performing one-dimensional filtering in the horizontal direction in FIG. 5B. In other words, the first to fifth coefficients C1 to C5 may be the same as the first to fifth coefficients C1 to C5 of FIG. 5B. However, the inventive concept is not limited thereto, and a one-dimensional filter used in performing one-dimensional filtering in the vertical direction may differ from the one-dimensional filter used in performing one-dimensional filtering in the horizontal direction in FIG. 5B.

A converted pixel value PV_V of the target pixel PX_T based on one-dimensional filtering in the vertical direction may be calculated based on the following Equation 2.

$$PV\_V = \frac{\sum_{i=1}^{N} Ci * P\_Vi}{2^K} \qquad \text{[Equation 2]}$$

For example, coefficient values of the first to fifth coefficients C1 to C5 may be multiplied by pixel values of the first to fifth pixels P_V1 to P_V5, and then, multiplied values may be summated. Subsequently, a maximum coefficient value (for example, a value divided as 8192) may be calculated as the converted pixel value PV_V of the target pixel PX_T.

Likewise, N−1 number of (for example, four) pixels PX having the same color disposed at an upper side and a lower side of the other pixels of the target pixel group PG_T may be used in one-dimensional filtering in the horizontal direction on each of the other pixels (for example, a red pixel R, a blue pixel B, and a second green pixel Gb) of the target pixel group PG_T.

Figure 7:
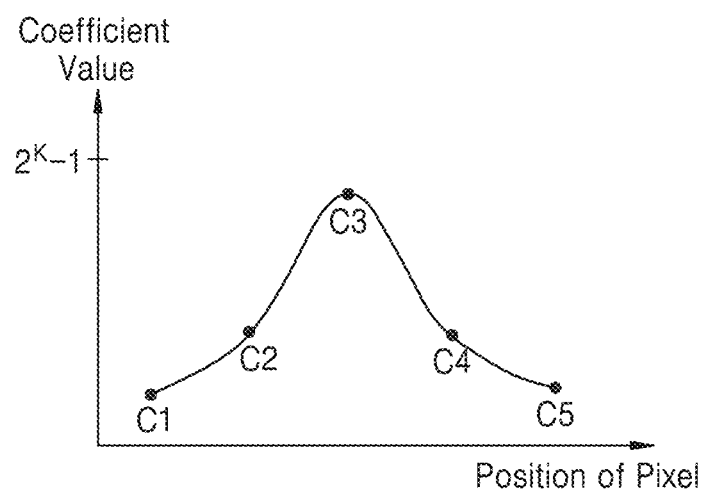
FIG. 7 is a graph showing a one-dimensional Gaussian filter according to an embodiment.

FIG. 7 is a graph showing a one-dimensional Gaussian filter according to an embodiment.

Referring to FIG. 7, the abscissa axis represents a position of a pixel to which a coefficient is applied, and the ordinate axis represents a coefficient value. A one-dimensional Gaussian filter may include N number of coefficients, each of the N coefficients may have one of $2^K$ number of coefficient values, and a distribution of the coefficient values may be represented by a Gaussian curve.

For example, the one-dimensional Gaussian filter may include first to fifth coefficients C1 to C5. In a case where a coefficient is expressed as 13 bits, the first to fifth coefficients C1 to C5 may have one of $2^{13}$ values (i.e., 8192 values), a minimum value of a coefficient may be "0", and a maximum value of the coefficient may be "8192".

As described above with reference to FIGS. 5B and 6B, N number of pixels may be applied to a target pixel and peripheral pixels of the same row or column as the target pixel, with respect to the target pixel (for example, PX_T of FIG. 5A). For example, the first to fifth coefficients C1 to C5 may be respectively applied to five pixels including a target pixel and peripheral pixels, and in this case, a coefficient value of the third coefficient C3 applied to the target pixel may be largest, and a coefficient value of an applied coefficient may decrease as a corresponding pixel is farther away from the target pixel. A sum of the first to fifth coefficients C1 to C5 may be $2^K-1$ (for example, "8191" (when K is 13)).

In an embodiment, a distribution of coefficient values (i.e., a gradient of the Gaussian curve) may vary based on the peripheral illumination of an image sensor (100 of FIG. 1).

Figure 8:
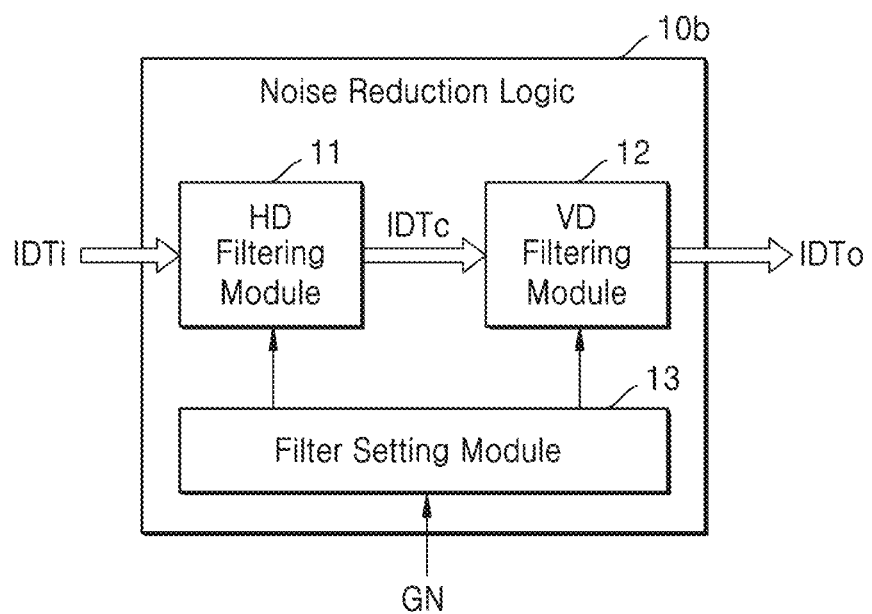
FIG. 8 illustrates an example of a noise reduction logic according to an embodiment.

FIG. 8 illustrates an example of a noise reduction logic 10b according to an embodiment. The noise reduction logic 10b of FIG. 8 may be applied as the noise reduction logic 10 of FIG. 1.

Referring to FIG. 8, the noise reduction logic 10b may include a first filtering module 11, a second filtering module 12, and a filter setting module 13. In a non-limiting embodiment, the first filtering module 11 and the second filtering module 12 may be implemented as hardware, and the filter setting module 13 may be implemented as firmware.

The first filtering module 11 may perform one-dimensional filtering in a first direction on input image data IDTi on the basis of a first filter, and continuously, the second filtering module 12 may perform one-dimensional filtering in a second direction on image data IDTc output from the first filtering module 11 on the basis of a second filter to generate output image data IDTo.

In describing operations of the first filtering module 11 and the second filtering module 12, descriptions which are the same as or similar to detailed descriptions given above with reference to FIG. 2 are omitted.

The filter setting module 13 may set a first filter and a second filter. As described above, each of the first filter and the second filter may be implemented as a one-dimensional Gaussian filter and may include $M^2$ number of one-dimensional Gaussian filters respectively applied to $M^2$ number of pixels. The one-dimensional Gaussian filter may include N number of coefficients respectively applied to N number of pixels.

The filter setting module 13 may adjust coefficient values of N coefficients of the one-dimensional Gaussian filter used in each of the first filtering module 11 and the second filtering module 12. In an embodiment, the filter setting module 13 may adjust a distribution of coefficient values (i.e., a gradient of the Gaussian curve) on the basis of the peripheral illumination of an image sensor (100 of FIG. 1). For example, the filter setting module 13 may receive gain information GN applied to a readout circuit (120 of FIG. 1) and may adjust a gradient of a Gaussian curve of the one-dimensional Gaussian filter on the basis of gain information GN.

Figure 9:
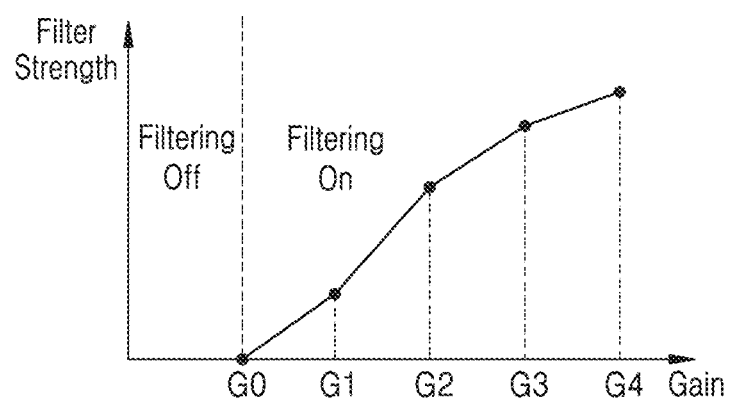
FIG. 9 is a graph showing gain-based filter strength according to an embodiment.

FIG. 9 is a graph showing gain-based filter strength according to an embodiment.

Referring to FIG. 9, the abscissa axis represents a gain, and the ordinate axis represents filter strength. A high illumination (or general illumination) environment is shown as a gain decreases, and a low illumination environment is shown as a gain increases. When a gain is low (for example, in a gain G0 or less) (i.e., in the high illumination environment), continuous one-dimensional filtering according to an embodiment may not be performed. Continuous one-dimensional filtering may be performed from the gain G0 or more (i.e., gains G0 to G4), and as a gain increases, the filter strength of a one-dimensional Gaussian filter may increase.

An image device equipped with an image sensor (100 of FIG. 1) may sense the peripheral illumination of the image sensor 100 and may provide gain setting information to the image sensor 100 on the basis of the peripheral illumination. A process (for example, a main process, an application processor (AP), or the like) of the image device may provide the image sensor 100 with exposure information, an analog gain, and a digital gain. The readout circuit 110 of the image sensor 100 may include an analog circuit (for example, a comparator, etc.), which analog-digital converts sensing signals received by a pixel array (110 of FIG. 1), and a digital circuit which processes digital converted signals, the analog gain may be applied to the analog circuit, and the digital gain may be applied to the digital circuit. As peripheral illumination decreases, the analog gain and the digital gain may increase. A gain (for example, a total gain) may be calculated based on the analog gain and the digital gain. For example, the multiplication of the analog gain and the digital gain may be calculated as a gain.

The analog gain and/or the digital gain may be set to be high, in order to increase the brightness of image data in the low illumination environment. Therefore, a gain may be low in the high illumination environment, and a gain may be high in the low illumination environment. Therefore, as peripheral illumination decreases, the amount of noise occurring in the image data may increase. Accordingly, as illustrated in FIG. 9, as a gain increases, filter strength may be set to be high, in order to reduce noise of the image data.

Figure 10:
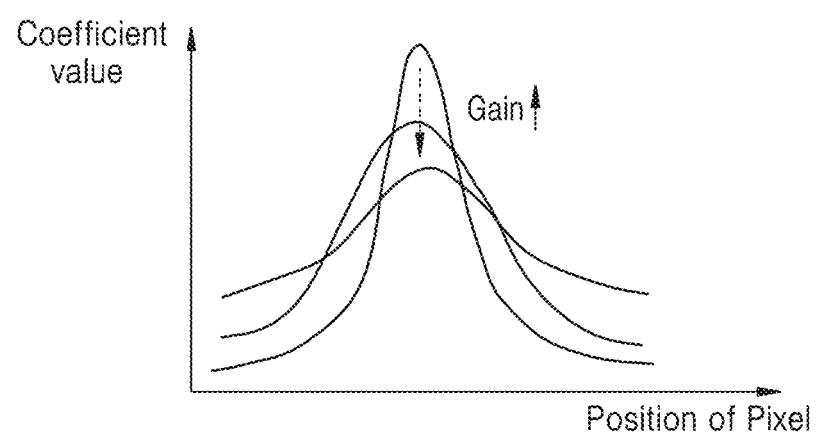
FIG. 10 is a graph showing a variation of a Gaussian curve with respect to the filter strength of a one-dimensional filter according to an embodiment.

FIG. 10 is a graph showing a variation of a Gaussian curve with respect to the filter strength of a one-dimensional filter according to an embodiment.

Referring to FIG. 10, the abscissa axis represents a position of a pixel to which a coefficient of a one-dimensional filter is applied, and the ordinate axis represents a coefficient value. A distribution of coefficient values of a one-dimensional filter may be represented by a Gaussian curve. As described above with reference to FIG. 9, when a gain is high, the strength of a one-dimensional filter may be set to be high, and when a gain is low, the strength of the one-dimensional filter may be set to be low. That the strength of the one-dimensional filter is strengthened may denote that a gradient of the Gaussian curve is gentled, and that the strength of the one-dimensional filter is weakened may denote that a gradient of the Gaussian curve is steepened. Therefore, as illustrated in FIG. 10, coefficient values of a first filter may be set so that a gradient of the Gaussian curve is gentled as a gain increases.

Referring again to FIG. 8, in an embodiment, coefficient values of $M^2$ number of one-dimensional Gaussian filters may be previously set for each gain (for example, for each of the gains G0 to G4 of FIG. 9), and the filter setting module 13 may apply coefficient values based on a gain GN which is set in the $M^2$ one-dimensional Gaussian filters.

In an embodiment, a reference Gaussian curve (i.e., reference coefficient values) may be previously set, and the filter setting module 13 may calculate filter strength based on a set gain on the basis of the reference Gaussian curve. For example, coefficient values of a one-dimensional filter corresponding to the gain G1 may be previously set as reference coefficient values. The filter setting module 13 may previously store a gain-based weight and may multiply reference coefficient values by a weight corresponding to the set gain GN to set coefficient values of a one-dimensional filter (i.e., a Gaussian curve) corresponding to the gain GN.

Figure 11:
FIG. 11 is a table showing a gain-based weight according to an embodiment.

FIG. 11 is a table showing a gain-based weight according to an embodiment.

Referring to FIG. 11, a table TB may include a gain and a weight set for the gain. N number of weights W0 to WN corresponding to N number of gains G0 to GN may be set. For example, each of the weights may have a value of a corresponding coefficient of coefficients of a one-dimensional filter.

For example, when the set gain is a gain G3, a filter setting module (13 of FIG. 8) may multiply reference coefficient values by the weight W0 to calculate coefficient values of a one-dimensional filter corresponding to the gain G3.

As described above, instead of that gain-based coefficient values of a first filter and a second filter may be previously set and stored and the set coefficient values are provided to the filter setting module 13, the filter setting module 13 may calculate coefficient values of a gain set based on reference coefficients and a gain-based weight. Therefore, a time for which gain-based coefficient values are loaded into the filter setting module 13 is reduced, and a setting time for setting the first filter and the second filter may be reduced.

Figure 12:
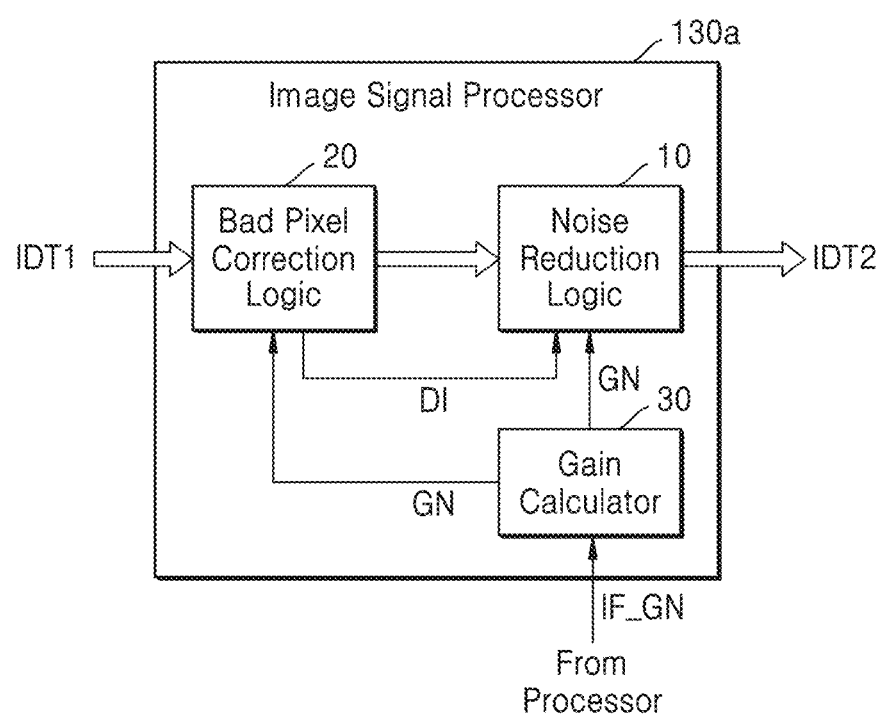
FIG. 12 is a block diagram schematically illustrating an image signal processor according to an embodiment.

FIG. 12 is a block diagram schematically illustrating an image signal processor 130a according to an embodiment. The image signal processor 130a of FIG. 12 may be applied as the image signal processor 130 of FIG. 1.

Referring to FIG. 12, the image signal processor 130a may include a bad pixel correction logic 20, a noise reduction logic 10, and a gain calculator 30. In a non-limiting embodiment, the bad pixel correction logic 20 and the noise reduction logic 10 may be implemented as hardware, and the gain calculator 30 may be implemented as firmware.

The image signal processor 130a may perform bad pixel correction and noise reduction processing on first image data IDT1 input thereto. The first image data IDT1 may be image data having a Bayer pattern.

The bad pixel correction logic 20 may correct pixel values of bad pixels included in the first image data IDT1. Here, the bad pixels may denote a pixel which does not have a pixel value corresponding to a certain gray level when a pixel value difference with peripheral pixels is greater than or equal to a reference value or the first image data IDTi represents an image having the certain gray level. The bad pixel correction logic 20 may perform bad pixel correction on the basis of a set algorithm, and for example, may set a pixel value of a bad pixel through interpolation based on pixel values of peripheral pixels or may average the pixel values of the peripheral pixels to set an average value as a pixel value of the bad pixel.

The noise reduction logic 10, as described above with reference to FIGS. 2 to 11, may continuously perform one-dimensional filtering in a plurality of directions on image data output from the bad pixel correction logic 20, thereby reducing noise of the image data. The noise reduction logic 10 may output noise-reduced image data (for example, second image data IDT2).

The gain calculator 30 may calculate a gain GN (for example, a total gain) on the basis of gain information IF_GN (for example, exposure information, an analog gain, or a digital gain) received from an external processor. For example, the gain calculator 30 may multiply the digital gain by the analog gain to calculate the gain GN.

The gain calculator 30 may provide the calculated gain GN to the bad pixel correction logic 20 and the noise reduction logic 10. The bad pixel correction logic 20 may use the gain GN in correcting pixel values of the bad pixels. Also, as described above with reference to FIG. 8, a filter setting module (13 of FIG. 8) included in the noise reduction logic 10 may set coefficient values of one-dimensional filters used in the noise reduction logic 10 on the basis of the gain GN. In an embodiment, the gain calculator 30 may be implemented as an element of the filter setting module 13 of the noise reduction logic 10.

In an embodiment, the bad pixel correction logic 20 may generate directionality information DI in a bad pixel correction process performed on the first image data IDT1 and may provide the directionality information DI to the noise reduction logic 10. Here, the directionality information DI may represent whether a certain pixel is included in an edge region. The edge region will be described below with reference to FIG. 14.

Figure 13:
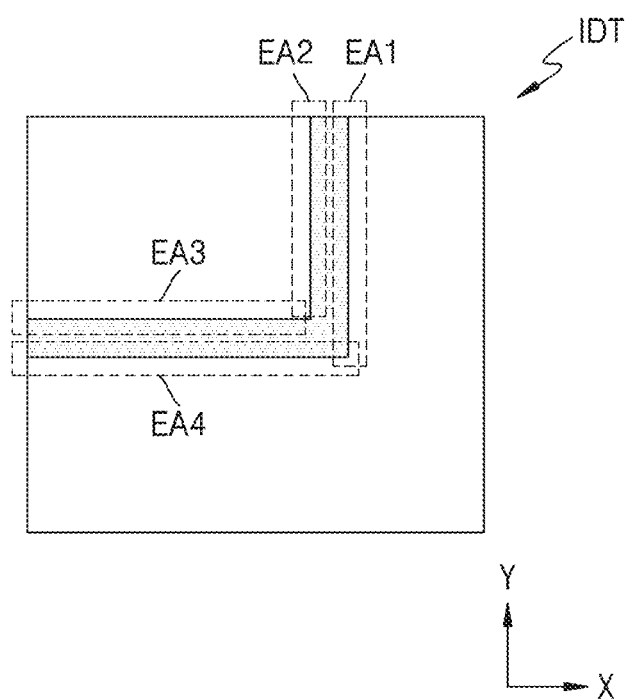
FIG. 13 is a diagram describing an edge region.

FIG. 13 is a diagram describing an edge region.

Referring to FIG. 13, image data IDT may include an edge region EAR where a gray level varies rapidly. For example, each of pixels of the image data IDT illustrated in FIG. 14 may have a gray level (for example, a pixel value corresponding to a maximum gray level) wholly corresponding to white, and first to fourth edge regions EA1 to EA4 may have, as a pixel value, a grayscale value corresponding to a gray level which has a difference of a certain gray level or more with a maximum gray level. The first and second edge regions EA1 and EA2 may be an edge region in a horizontal direction (for example, an X-axis direction) and may be referred to as a horizontal edge region. The third and fourth edge regions EA3 and EA4 may be an edge region in a vertical direction (for example, a Y-axis direction) and may be referred to as a vertical edge region.

In a case where one-dimensional filtering is performed on an edge region (for example, the first to fourth edge regions EA1 to EA4), the definition of the edge region may decrease, and due to this, the image quality of the image data IDT may be degraded. Therefore, one-dimensional filtering may not be performed on an edge region.

Referring to FIG. 12, the directionality information DI may represent whether a pixel is included in a horizontal edge region or is included in a horizontal edge region. The noise reduction logic 10 may skip one-dimensional filtering in a horizontal direction on a pixel included in the horizontal edge region on the basis of the directionality information DI and may skip one-dimensional filtering in a vertical direction on a pixel included in the vertical edge region.

The image signal processor 130a corresponding to a plurality of pixels may remove an offset value from first image data IDT1 before performing image processing on the first image data IDT1. The image signal processor 130a may perform image processing on the first image data IDT1, from which the offset value has been removed, to generate second image data IDT2 and may apply the offset value to the second image data IDT2 again.

Figure 14:
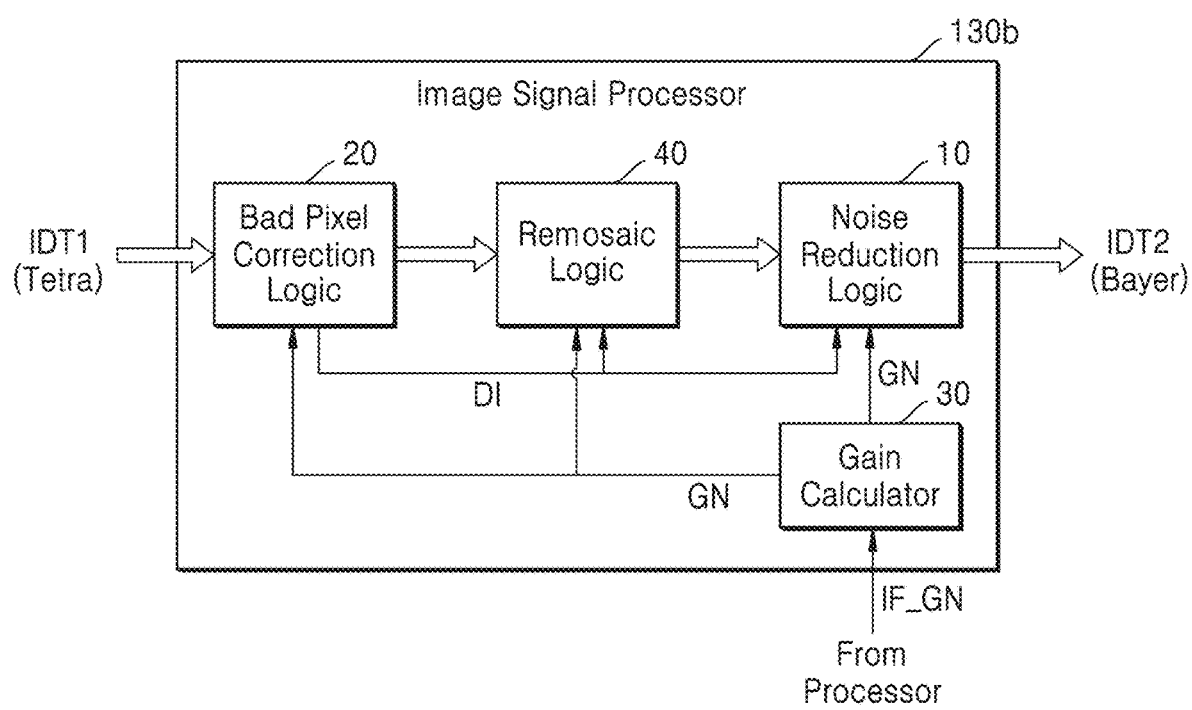
FIG. 14 is a block diagram schematically illustrating an image signal processor according to an embodiment.
Figure 15A:
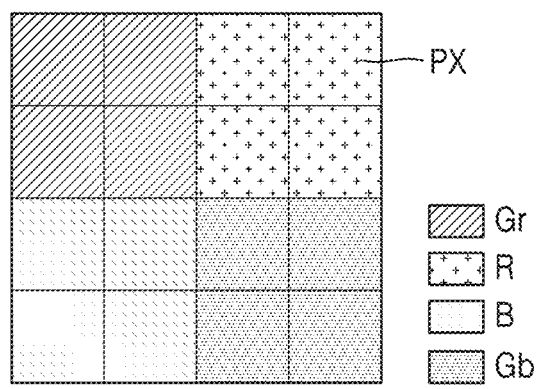
FIGS. 15A-15C are diagrams describing a tetra pattern, a nona pattern, and a hexa deca pattern, respectively.
Figure 15B:
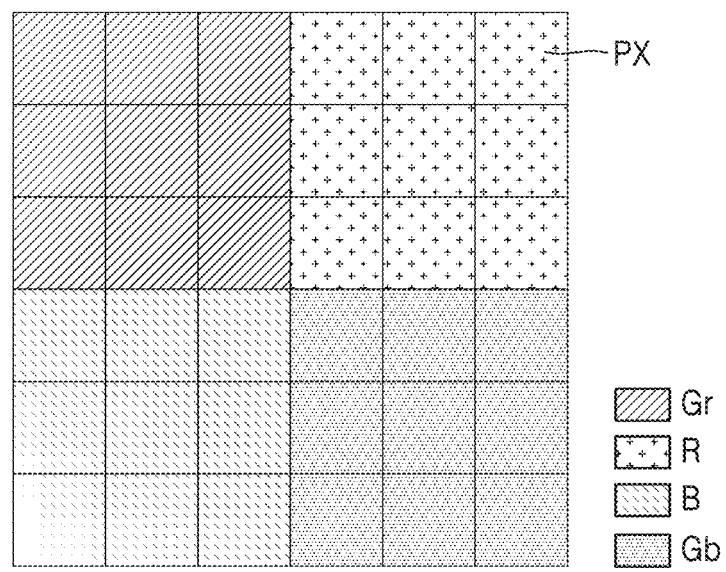
Figure 15C:
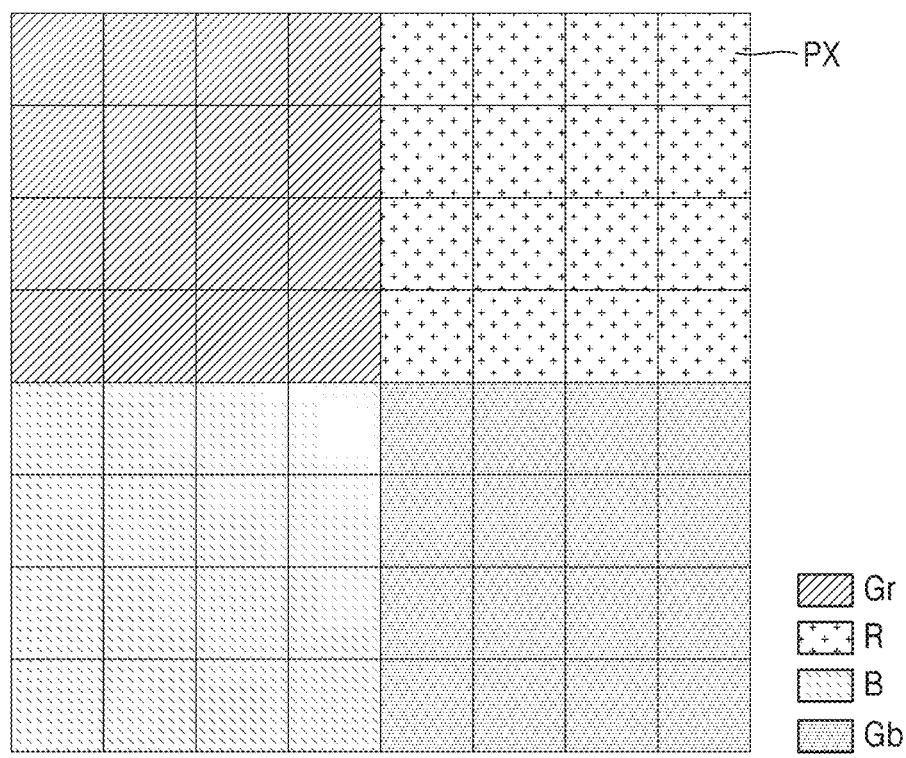

FIG. 14 is a block diagram schematically illustrating an image signal processor according to an embodiment. FIGS. 15A to 15C are diagrams describing patterns of image data. The image signal processor 130b of FIG. 14 may be applied as the image signal processor 130 of FIG. 1.

Referring to FIG. 14, the image signal processor 130b may include a bad pixel correction logic 20, a remosaic logic 40, a noise reduction logic 10, and a gain calculator 30. In a non-limiting embodiment, the bad pixel correction logic 20, the remosaic logic 40, and the noise reduction logic 10 may be implemented as hardware, and the gain calculator 30 may be implemented as firmware.

First image data IDT1 input to the image signal processor 130b may have a pattern instead of a Bayer pattern. For example, the first image data IDT1 may have a tetra pattern of FIG. 15A, a nona pattern of FIG. 15B, or a hexa deca pattern of FIG. 15C. The tetra pattern, the nona pattern, and the hexa deca pattern may each be a modified pattern of the Bayer pattern.

Referring to FIG. 15A, the tetra pattern may include four first green pixels Gr, four red pixels R, four blue pixels B, and four second green pixels Gb, which are each arranged in a 2×2 matrix. The four first green pixels Gr and the four second green pixels Gb may be arranged in a diagonal direction, and the four red pixels R and the four blue pixels B may be arranged in a diagonal direction.

Referring to FIG. 15B, the nona pattern may include nine first green pixels Gr, nine red pixels R, nine blue pixels B, and nine second green pixels Gb, which are each arranged in a 3×3 matrix. The nine first green pixels Gr and the nine second green pixels Gb may be arranged in a diagonal direction, and the nine red pixels R and the nine blue pixels B may be arranged in a diagonal direction.

Referring to FIG. 15C, the hexa deca pattern may include sixteen first green pixels Gr, sixteen red pixels R, sixteen blue pixels B, and sixteen second green pixels Gb, which are each arranged in a 4×4 matrix. The sixteen first green pixels Gr and the sixteen second green pixels Gb may be arranged in a diagonal direction, and the sixteen red pixels R and the sixteen blue pixels B may be arranged in a diagonal direction.

Referring to FIG. 14, the bad pixel correction logic 20 may perform bad pixel correction on the first image data IDT1, and then, the remosaic logic 40 may perform remosaic processing on image data output from the bad pixel correction logic 20. The remosaic logic 40 may convert the image data, which has a pattern (for example, the tetra pattern, the nona pattern, and the hexa deca pattern) instead of the Bayer pattern, into the Bayer pattern.

The noise reduction logic 10 may perform noise reduction processing on image data converted into the Bayer pattern and may output noise-reduced second image data IDT2. The second image data IDT2 may have the Bayer pattern.

In an embodiment, the bad pixel correction logic 20, the remosaic logic 40, and the noise reduction logic 10 may perform bad pixel correction, remosaic processing, and noise reduction processing on the basis of the gain GN provided from the gain calculator 30.

In an embodiment, the bad pixel correction logic 20 may provide the directionality information DI to the remosaic module 40 and the noise reduction module 10, the remosaic module 40 may perform remosaic on the basis of the directionality information DI, and the noise reduction module 10 may skip one-dimensional filtering on a certain pixel on the basis of the directionality information DI.

Figure 16:
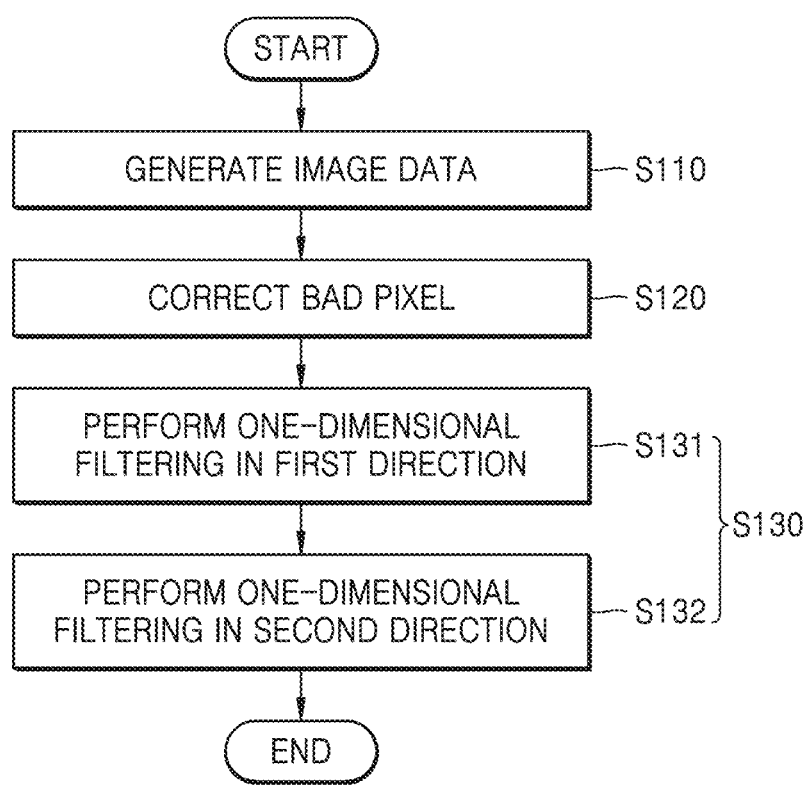
FIG. 16 is a flowchart illustrating an operating method of an image sensor, according to an embodiment.

FIG. 16 is a flowchart illustrating an operating method of an image sensor, according to an embodiment. The operating method of FIG. 16 may be performed by the image sensor 100 of FIG. 1, and the above description of the image sensor 100 may be applied to the present embodiment.

Referring to FIGS. 1 and 16, the image sensor 100 may generate image data in operation S110. The readout circuit 120 may analog-digital convert sensing signals received from the pixel array 110 to generate the image data.

Subsequently, the image sensor 100 may perform image processing on the image data. In operation S120, the image sensor 100 may perform bad pixel correction on the image data. Also, the image sensor 100 may perform noise reduction processing on the image data in operation S130. In an embodiment, when the image data has a pattern instead of the Bayer pattern, remosaic processing may be performed on the image data before the noise reduction processing. Therefore, the image data may have the Bayer pattern, and the noise reduction processing may be performed on the image data having the Bayer pattern.

In operation S130, one-dimensional filtering in a first direction (for example, a horizontal direction) may be performed on the image data in operation S131. Subsequently, one-dimensional filtering in a second direction (for example, a vertical direction) may be performed on the image data on which the one-dimensional filtering in the horizontal direction has been performed in operation S132. In an embodiment, one-dimensional filtering in different directions may be further performed. One-dimensional filtering may be performed based on a one-dimensional Gaussian filter, and a one-dimensional Gaussian filter used in the one-dimensional filtering in the vertical direction may be the same as or different from a one-dimensional Gaussian filter used in the one-dimensional filtering the horizontal direction.

Image data on which the noise reduction processing has been performed may be provided to an external processor. However, the inventive concept is not limited thereto, and other image processing may be performed on the image data on which the noise reduction processing has been performed or compression processing may be performed on the image data and image data on which the other image processing or the compression processing has been performed may be provided to the external processor.

Figure 17A:
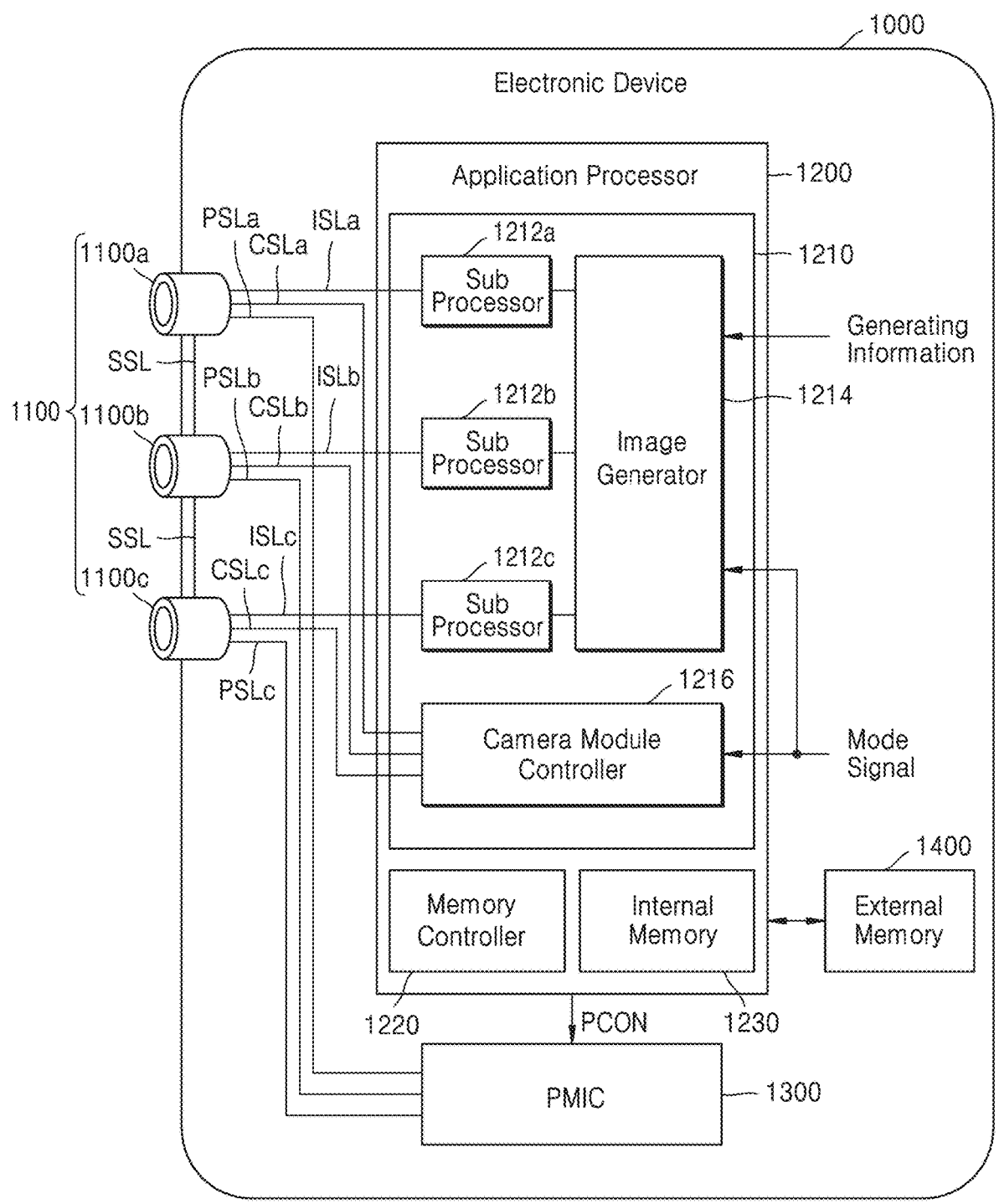
FIG. 17A is a block diagram of an electronic device including a multi camera module.
Figure 17B:
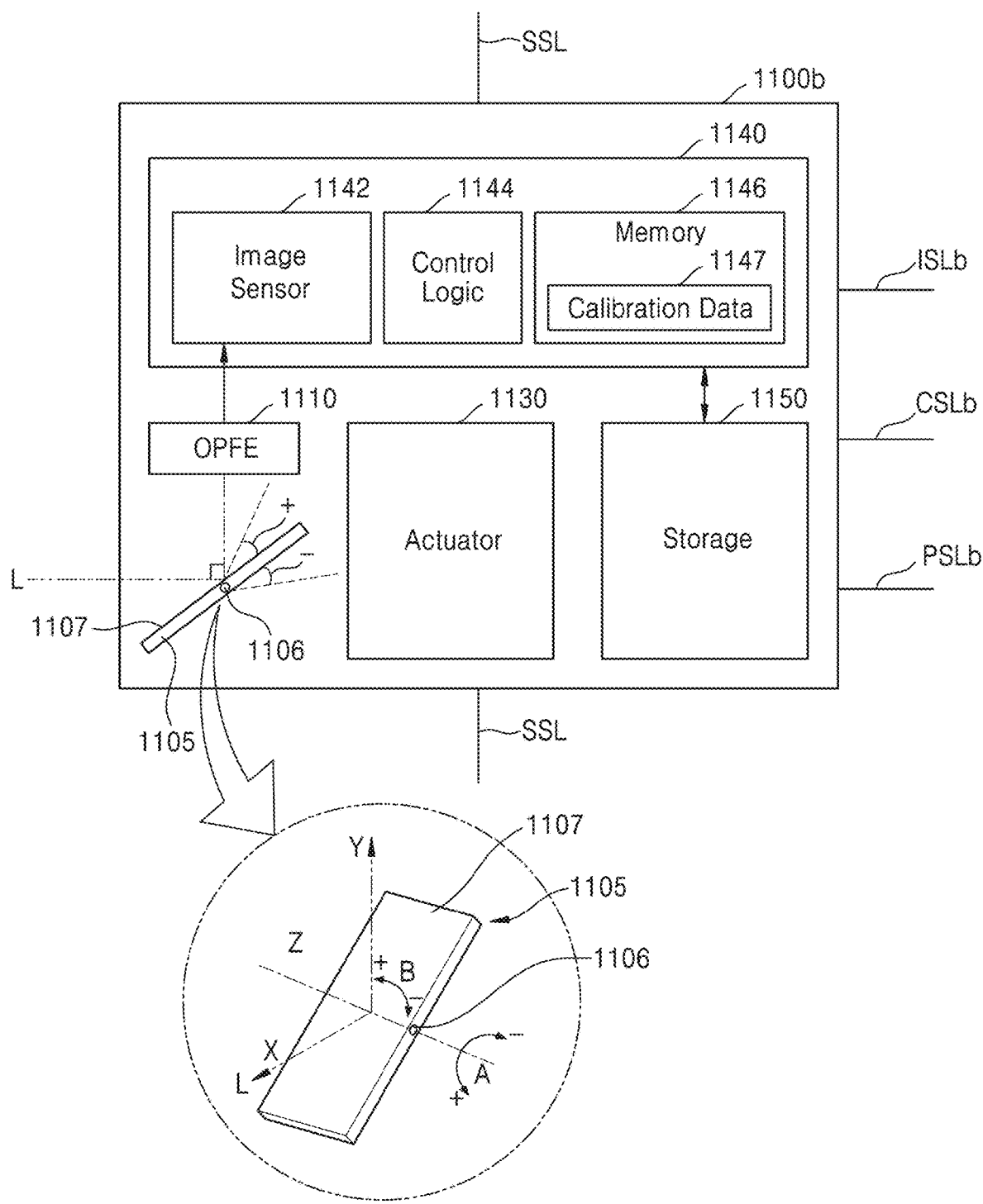
FIG. 17B is a detailed block diagram of a camera module of FIG. 17A.

FIG. 17A illustrates an electronic device including a multi-camera module, and FIG. 17B is a detailed block diagram of a camera module of FIG. 15.

Referring to FIG. 17A, an electronic device 1000 may include a camera module group 1100, an application processor 1200, a power management integrated circuit (PMIC) 1300, and an external memory 1400.

Figure 18:
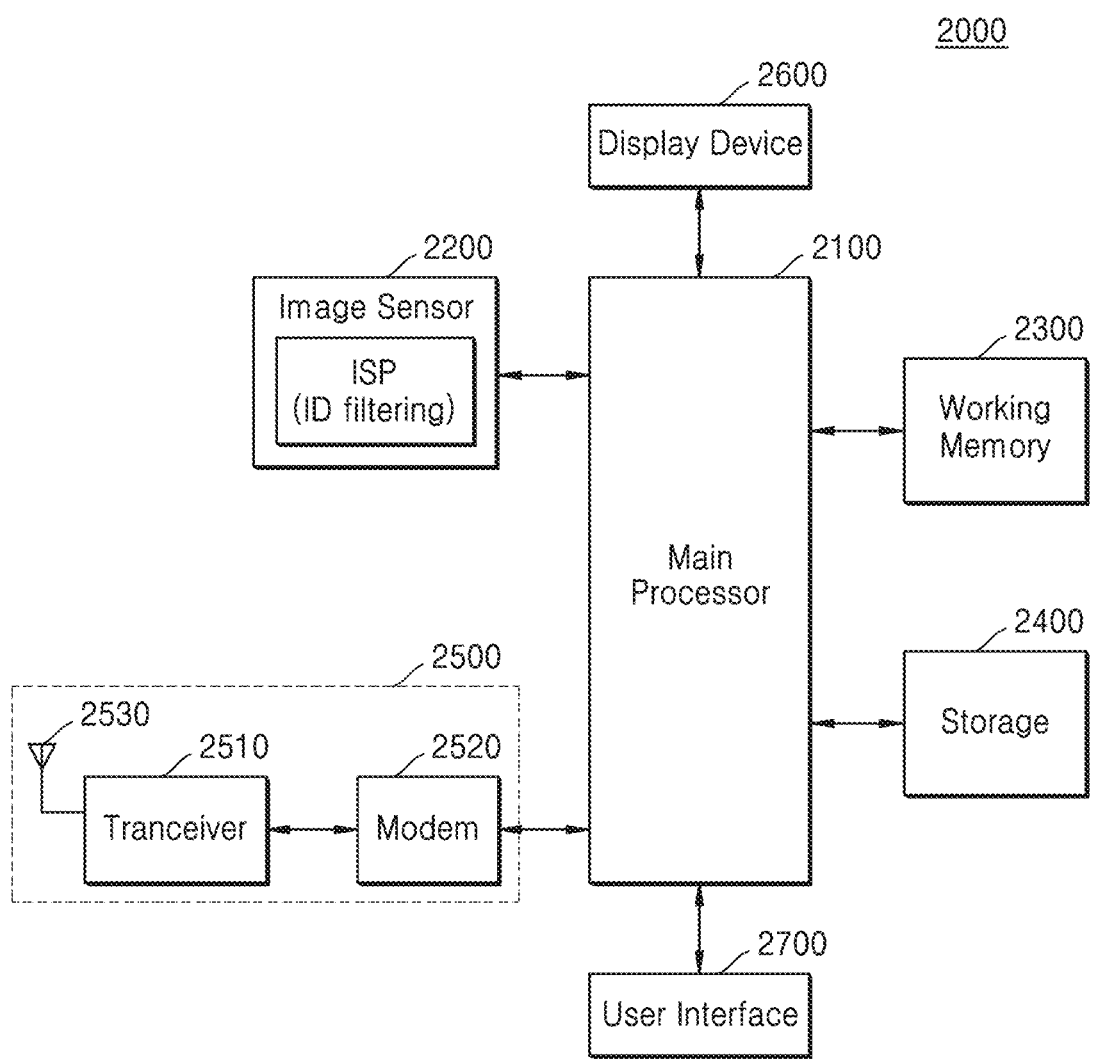
FIG. 18 is a block diagram illustrating an electronic device including an image sensor, according to an embodiment.

The camera module group 1100 may include a plurality of camera modules 1100a, 1100b, and 1100c. Although FIG. 18 shows an embodiment in which three camera modules 1100a, 1100b, and 1100c are arranged, an embodiment is not limited thereto. In some embodiments, for example, the camera module group 1100 may include two camera modules, or may include k (where k is a natural number greater than or equal to 4) camera modules.

Hereinafter, a detailed configuration of the camera module 1100b will be described in more detail with reference to FIG. 17B, and the following description may be equally applied to the other camera modules 1100a and 1100c according to embodiments.

Referring to FIG. 17B, the camera module 1100b may include a prism 1105, an optical path folding element (hereinafter, referred to as "OPFE") 1110, an actuator 1130, an image sensing device 1140, and a storage 1150.

The prism 1105 may include a reflective surface 1107 of a light reflecting material and change a path of light L incident from the outside.

In some embodiments, the prism 1105 may change the path of the light L incident in a first direction X to a second direction Y perpendicular to the first direction X. In addition, the prism 1105 may rotate on a central axis 1106 of the reflective surface 1107 of a light reflecting material in an A direction or a B direction, thereby changing the path of the light L incident in the first direction X to the second direction Y perpendicular thereto. In this case, the OPFE 1110 may also move in a third direction Z perpendicular to the first direction X and the second direction Y.

In some embodiments, the greatest rotation angle of the prism 1105 in the A direction is less than 15 degrees in a +A direction and may be greater than 15 degrees in a −A direction, as shown in FIG. 15B, but embodiments are not limited thereto.

In some embodiments, the prism 1105 may move in a range of approximately 20 degrees or may move between 10 degrees and 20 degrees or between 15 degrees and 20 degrees in a +B or −B direction, and angles of movement may be the same as each other in the +B or −B direction or may be within a range of 1 degree.

In some embodiments, the reflective surface 1107 of the light reflective material of the prism 1105 may move in the third direction (for example, the Z direction) parallel to an extension direction of the central axis 1106.

In some embodiments, the camera module 1100b may include two or more prisms, thereby variously changing the path of the light L incident in the first direction X to a second direction Y perpendicular to the first direction X, to the first direction X or the third direction Z, and then to the second direction Y again.

The OPFE 1110 may include, for example, an optical lens including m (m is a natural number) groups. The m lenses may move in the second direction Y to change an optical zoom ratio of the camera module 1100b. For example, when a basic optical zoom ratio of the camera module 1100b is referred to as Z, and when m optical lenses included in the OPFE 1110 are moved, the optical zoom ratio of the camera module 1100b may be changed to 3Z, 5Z, or more.

The actuator 1130 may move the OPFE 1110 or an optical lens (hereinafter, referred to as an optical lens) to a specific position. For example, the actuator 1130 may adjust a position of the optical lens for accurate sensing so that an image sensor 1142 is located at a focal length of the optical lens.

The image sensing device 1140 may include the image sensor 1142, a control logic 1144, and a memory 1146. The image sensor 1142 may sense an image of a sensing target by using the light L provided through the optical lens.

The pixel and the pixel array described above with reference to FIGS. 1 to 17 may be applied to the image sensor 1142. The image signal processor may continuously perform one-dimensional filtering in a plurality of directions on image data, and thus, noise of the image data may be reduced.

The control logic 1144 may control operations of the camera module 1100b and process the sensed image. For example, the control logic 1144 may control the operations of the camera module 1100b according to a control signal provided through a control signal line CSLb, and may extract image data (for example, face, arms, legs, and the like in an image) corresponding to a specific image in the sensed image or perform image processing such as noise removal.

The memory 1146 may store information, such as calibration data 1147 for the operation of the camera module 1100b. The calibration data 1147 may be information for the camera module 1100b to generate image data by using the light L provided from the outside and may include, for example, information on a degree of rotation, information on a focal length, information on an optical axis, and the like. When the camera module 1100b includes a multi-state camera of which the focal length is changed according to a position of the optical lens, the calibration data 1147 may include information on focal length values for each position (or state) of the optical lens and on auto focusing.

The storage 1150 may store image data sensed by the image sensor 1142. The storage 1150 may be arranged outside the image sensing device 1140 and may be implemented in a stacked form with a sensor chip constituting the image sensing device 1140. In some embodiments, the image sensor 1142 may include a first chip, and the control logic 1144, the storage 1150, and the memory 1146 may include a second chip so that the two chips may be stacked.

In some embodiments, the storage 1150 may include an electrically erasable programmable read-only memory (EEPROM), but embodiments are not limited thereto. In some embodiments, the image sensor 1142 may include a pixel array, and the control logic 1144 may include an analog to digital converter and an image signal processor for processing the sensed image.

Referring to FIGS. 17A and 17B, in some embodiments, each of the plurality of camera modules 1100a, 1100b, and 1100c may include the actuator 1130. Accordingly, the plurality of camera modules 1100a, 1100b, and 1100c may include the calibration data 1147 which are the same as each other or different from each other according to an operation of the actuator 1130 included therein.

In some embodiments, one camera module (for example, 1100*b*) among the plurality of camera modules 1100*a*, 1100*b*, and 1100*c* may be a folded lens-type camera module including the prism 1105 and the OPFE 1110 described above, and the other camera modules (for example, 1100*a* and 1100*c*) may be vertical-type camera modules that do not include the prism 1105 and the OPFE 1110, but are not limited thereto.

In some embodiments, one camera module (for example, 1100*c*) among the plurality of camera modules 1100*a*, 1100*b*, and 1100*c* may be a depth camera of a vertical shape for extracting depth information by using, for example, infrared ray (IR). In this case, the application processor 1200 may merge image data provided from the depth camera with image data provided from another camera module (for example, 1100*a* or 1100*b*) and provide a three-dimensional (3D) depth image.

In some embodiments, at least two camera modules (for example, 1100*a* and 1100*b*) among the plurality of camera modules 1100*a*, 1100*b*, and 1100*c* may have different angles of field of view. In this case, for example, optical lenses of at least two camera modules (for example, 1100*a* and 1100*b*) among the plurality of camera modules 1100*a*, 1100*b*, and 1100*c* may be different from each other, but are not limited thereto.

In addition, in some embodiments, angles of field of view of each of the plurality of camera modules 1100*a*, 1100*b*, and 1100*c* may be different from each other. For example, the camera module 1100*a* may be an ultrawide camera, the camera module 1100*b* may be a wide camera, and the camera module 1100*c* may be a tele camera but are not limited thereto. In this case, the optical lenses included in each of the plurality of camera modules 1100*a*, 1100*b*, and 1100*c* may also be different from each other, but the present disclosure is not limited thereto.

In some embodiments, the plurality of camera modules 1100*a*, 1100*b*, and 1100*c* may be physically separated from each other and arranged. That is, a sensing region of one image sensor 1142 is not divided by the plurality of camera modules 1100*a*, 1100*b*, and 1100*c*, and an independent image sensor 1142 may be arranged inside each of the plurality of camera modules 1100*a*, 1100*b*, and 1100*c*.

Referring back to FIG. 17A, the application processor 1200 may include an image processing device 1210, a memory controller 1220, and an internal memory 1230. The application processor 1200 may implemented separately from the plurality of camera modules 1100*a*, 1100*b*, and 1100*c*. For example, the application processor 1200 and the plurality of camera modules 1100*a*, 1100*b*, and 1100*c* may be implemented as separate semiconductor chips. The image processing device 1210 may include a plurality of sub-image processors 1212*a*, 1212*b*, and 1212*c*, an image generator 1214, and a camera module controller 1216.

The image processing device 1210 may include the plurality of sub-image processors 1212*a*, 1212*b*, and 1212*c* corresponding to the plurality of camera modules 1100*a*, 1100*b*, and 1100*c*, respectively.

Image data generated from each of the camera modules 1100*a*, 1100*b*, and 1100*c* may be provided to the corresponding sub-image processors 1212*a*, 1212*b*, and 1212*c* through image signal lines ISLa, ISLb, and ISLc separated from each other. For example, image data generated by the camera module 1100*a* may be provided to the sub-image processor 1212*a* through an image signal line ISLa, image data generated by the camera module 1100*b* may be provided to the sub-image processor 1212*b* through an image signal line ISLb, and image data generated by the camera module 1100*c* may be provided to the sub-image processor 1212*c* through an image signal line ISLc. Such image data transmission may be performed by using, for example, a camera serial interface (CSI) based on a mobile industry processor interface (MIPI) but is not limited thereto.

In some embodiments, one sub-image processor may be arranged to correspond to a plurality of camera modules. For example, the sub-image processor 1212*a* and the sub-image processor 1212*c* may be integrated into one sub-image processor without being separated from each other as shown in FIG. 15A, and image data provided from the camera modules 1100*a* and 1100*c* may be selected by a selection element (for example, a multiplexer) or the like and then provided to the integrated sub-image processor. In this case, the sub-image processor 1212*b* may receive image data from the camera module 1100*b* without being integrated thereinto.

In addition, in some embodiments, image data generated by the camera module 1100*a* may be provided to the sub-image processor 1212*a* through the image signal line ISLa, image data generated by the camera module 1100*b* may be provided to the sub-image processor 1212*b* through the image signal line ISLb, and image data generated by the camera module 1100*c* may be provided to the sub-image processor 1212*c* through the image signal line ISLc. In addition, image data processed by the sub-image processor 1212*b* may be directly provided to the image generator 1214, and image data processed by the sub-image processors 1212*a* and 1212*c* may be selected by selection elements (for example, multiplexers) or the like and then provided to the image generator 1214.

Each of the sub-image processors 1212*a*, 1212*b*, and 1212*c* may perform image processing such as bad pixel correction, 3A adjustments of auto-focus correction, auto-white balance, and auto-exposure, noise reduction, sharpening, gamma control, and re-mosaic for the image data provided from the camera modules 1100*a*, 1100*b*, and 1100*c*.

In some embodiments, re-mosaic signal processing may be performed for each of the camera modules 1100*a*, 1100*b*, and 1100*c*, and then, results of the re-mosaic signal processing may be provided to the sub-image processors 1212*a*, 1212*b*, and 1212*c*.

The image data processed by each of the sub-image processors 1212*a*, 1212*b*, and 1212*c* may be provided to the image generator 1214. The image generator 1214 may generate an output image by using the image data provided from each of the sub-image processors 1212*a*, 1212*b*, and 1212*c* according to image generation information or a mode signal.

The image generator 1214 may generate an output image by merging at least some of the image data generated by the image processors 1212*a*, 1212*b*, and 1212*c* according to the image generation information or the mode signal. In addition, the image generator 1214 may generate the output image by selecting any one of the image data generated by the image processors 1212*a*, 1212*b*, and 1212*c* according to the image generation information or the mode signal.

In some embodiments, the image generation information may include a zoom signal or a zoom factor. In addition, in some embodiments, the mode signal may be a signal based on, for example, a mode selected by a user.

When the image generation information is a zoom signal (zoom factor), and when the camera modules 1100*a*, 1100*b*, and 1100c have different fields of view (angles of field of view), the image generator 1214 may perform different operations depending on types of the zoom signal. For example, when the zoom signal is a first signal, the image generator 1214 may generate an output image by using image data outputted from the sub-image processors 1212a and 1212b among image data outputted from the sub-image processors 1212a and 1212c. When the zoom signal is a second signal different from the first signal, the image generator 1214 may generate an output image by using image data outputted from the sub-image processors 1212c and 1212b among image data outputted from the sub-image processors 1212a and 1212c. If the zoom signal is a third signal different from the first signal and the second signal, the image generator 1214 does not perform the image data merging and generate the output image by selecting any one of image data outputted from each of the sub-image processors 1212a, 1212b, and 1212c. However, embodiments are not limited thereto, and a method of processing image data may be modified to meet application criteria.

In some embodiments, the image processing device 1210 may further include a selector (not shown) that selects outputs of the sub-image processors 1212a, 1212b, and 1212c and transmits the selected output to the image generator 1214. In an embodiment, the selection unit may be implemented as a multiplexer, for example, a 3×1 multiplexer.

In this case, the selector may perform different operations according to a zoom signal or a zoom factor. For example, when the zoom signal is a fourth signal (for example, a zoom ratio is a first ratio), the selector may select any one of outputs of the sub-image processors 1212a, 1212b, and 1212c and transmit the selected output to the image generator 1214.

In addition, when the zoom signal is a fifth signal different from the fourth signal (for example, the zoom ratio is a second ratio), the selector may sequentially transmit p (p is a natural number greater than or equal to 2) outputs among the outputs of the sub-image processors 1212a, 1212b, and 1212c to the image generator 1214. For example, the selector may sequentially transmit the output of the sub-image processor 1212b and the output of the sub-image processor 1212c to the image generator 1214. In addition, the selector may sequentially transmit the output of the sub-image processor 1212a and the output of the sub-image processor 1212b to the image generator 1214. The image generator 1214 may generate one output image by merging the p outputs that are sequentially received.

Here, the sub-image processors 1212a, 1212b, and 1212c perform image processing such as re-mosaic, down scaling to a video/preview resolution size, gamma correction, and high dynamic range (HDR) processing, and then the processed image data is transmitted to the image generator 1214. Accordingly, even when the processed image data is provided to the image generator 1214 through the selector and one signal line, an image merging operation of the image generator 1214 may be performed at a high speed.

In some embodiments, the image generator 1214 may receive a plurality of pieces of image data having different exposure times from at least one of the plurality of sub-image processors 1212a, 1212b, and 1212c, and perform the high dynamic range (HDR) processing on the plurality of pieces of image data, thereby generating merged image data with an increased dynamic range.

The camera module controller 1216 may provide control signals to the camera modules 1100a, 1100b, and 1100c. The control signals generated by the camera module controller 1216 may be provided to the corresponding camera modules 1100a, 1100b, and 1100c through the control signal lines CSLa, CSLb, and CSLc separated from each other.

Any one of the plurality of camera modules 1100a, 1100b, and 1100c may be designated as a master camera (for example, 1100b) according to image generation information including a zoom signal, or a mode signal, and the other camera modules (for example, 1100a and 1100c) may be designated as slave cameras. Such information may be included in the control signals and provided to the corresponding camera modules 1100a, 1100b, and 1100c through the control signal lines CSLa, CSLb, and CSLc separated from each other.

Camera modules operating as a master and slaves may be changed according to a zoom factor or an operation mode signal. For example, when an angle of field of view of the camera module 1100a is wider than an angle of field of view of the camera module 1100b and a zoom factor thereof represents a low zoom ratio, the camera module 1100a may operate as a master, and the camera module 1100b may operate as a slave. In contrast to this, when the zoom factor represents a high zoom ratio, the camera module 1100b may operate as a master and the camera module 1100a may operate as a slave.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. When receiving the sync enable signal, the camera module 1100b may generate a sync signal based on the provided sync enable signal and transmit the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signals provided from the camera module controller 1216 to the plurality of camera modules 1100a, 1100b, and 1100c may include mode information according to a mode signal. The plurality of camera modules 1100a, 1100b, and 1100c may operate in a first operation mode and a second operation mode in relation to a sensing speed, based on the mode information.

The plurality of camera modules 1100a, 1100b, and 1100c may generate image signals at a first speed in a first operation mode (for example, generate the image signals of a first frame rate), and encode the image signals at a second speed higher than the first speed (for example, encode image signals of a second frame rate higher than the first frame rate), and transmit the encoded image signals to the application processor 1200. In this case, the second speed may be lower than or equal to 30 times the first speed.

The application processor 1200 may store the received image signal, that is, the encoded image signal, in the memory 1230 included therein or in the external memory 1400 outside the application processor 1200, and then, read the encoded image signal from the memory 1230 or the external memory 1400 and decode the encoded signal, and display image data generated based on the decoded image signal. For example, a corresponding sub-image processor among the plurality of sub-image processors 1212a, 1212b, and 1212c of the image processing device 1210 may perform decoding, and also perform image processing on the decoded image signal.

The plurality of camera modules 1100a, 1100b, and 1100c may each generate an image signal at a third speed lower than the first speed in the second operation mode (for example, an image signal of a third frame rate lower than the first frame rate) and transmit the image signal to the application processor 1200. The image signal provided to the application processor 1200 may be a signal which is not encoded. The application processor 1200 may perform image processing on the received image signal or may store the image signal in the memory 1230 or the external memory 1400.

The PMIC 1300 may supply power, for example, a power supply voltage to the plurality of camera modules 1100a, 1100b, and 1100c. For example, the PMIC 1300 may supply first power to the camera module 1100a through a power signal line PSLa, second power to the camera module 1100b through a power signal line PSLb, and third power to the camera module 1100c through a power signal line PSLc, under the control of the application processor 1200.

The PMIC 1300 may generate power corresponding to each of the plurality of camera modules 1100a, 1100b, and 1100c in response to a power control signal PCON from the application processor 1200 and may also adjust a level of the power. The power control signal PCON may include power adjustment signals for each operation mode of the plurality of camera modules 1100a, 1100b, and 1100c. For example, the operation mode may include a low power mode, and in this case, the power control signal PCON may include information on a camera module operating in the low power mode and a level of power to be set. Levels of powers provided to the plurality of camera modules 1100a, 1100b, and 1100c may be the same as each other or different from each other. In addition, the levels of power may be dynamically changed.

FIG. 18 is a block diagram illustrating an electronic device 2000 including an image sensor, according to an embodiment. The electronic device 2000 of FIG. 18 may include a portable terminal.

Referring to FIG. 18, the electronic device 2000 may include a main processor 2100, an image sensor 2200, a display device 2600, a working memory 2300, a storage 2400, a user interface 2700, and a wireless transceiver 2500.

The main processor 2100 may be implemented as a system on chip (SoC) which controls an overall operation of the electronic device 2000 and drives an application program, an operating system, etc. The main processor 2100 may provide the display device 2600 with image data provided from the image sensor 2200, or may store the image data in the storage 2400. In an embodiment, the main processor 2100 may include an image processing circuit and may perform image processing, such as image quality adjustment and data format conversion, on the image data received from the image sensor 2200.

The image sensor 100 described above with reference to FIGS. 1 to 16 may be applied as the image sensor 2200. The image sensor 2200 may include an image signal processor ISP, and the image signal processor ISP may continuously perform one-dimensional filtering in a plurality of directions on the image data. Therefore, noise of the image data may be reduced.

The working memory 2300 may be implemented as a volatile memory, such as a dynamic random access memory (RAM) (DRAM) or static RAM (SRAM), or a non-volatile resistive memory such as phase change RAM (PRAM) or resistive RAM (ReRAM). An operating program or an application program stored in the storage 2400 may be loaded into the working memory 2300 or executed. Also, data generating in performing an operation of the electronic device 2000 may be temporarily stored in the working memory 2300.

The storage 2400 may be implemented as a non-volatile memory such as NAND flash memory or resistive memory, and for example, the storage 2400 may be provided as a memory card (for example, a multimedia card (MMC), an embedded multi-media card (eMMC), a secure digital (SD) card, or a micro SD). The storage 2400 may store image data provided from the image sensor 2200. Also, the storage 2400 may store an operating program, an application program, and the like of the electronic device 2000.

The user interface 2700 may be implemented as various devices, such as a keyboard, a curtain key panel, a touch panel, a finger print sensor, and a microphone, which may receive a user input. The user interface 2700 may receive the user input and may provide the main processor 2100 with a signal corresponding to the received user input.

The wireless transceiver 2500 may include a transceiver 2510, a modem 2520, and an antenna 2530. The wireless transceiver 2500 may perform wireless communication with an external device and may receive data from the external device or may transmit data to the external device.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:
1. An image sensor comprising:
a pixel array configured to convert a received optical signal into electrical signals;
a readout circuit configured to analog-digital convert the electrical signals to generate image data; and
an image signal processor configured to perform one-dimensional filtering in each of a first direction and a second direction on the image data to remove noise of the image data, the second direction being different than the first direction;
wherein the image signal processor is configured to
perform the one-dimensional filtering by applying a one-dimensional Gaussian filter to a plurality of pixels which have a same color and are arranged in the first direction or the second direction, wherein the image signal processor is configured to store a plurality of weights corresponding to each of a plurality of gains and adjust strength of the one-dimensional Gaussian filter by multiplying reference coefficients of the one-dimensional Gaussian filter by a weight corresponding to a set gain among the plurality of weights, a value of a first coefficient applied to a filtering target pixel among a plurality of coefficients included in the one-dimensional Gaussian filter being reduced as strength of the one-dimensional Gaussian filter increases;

calculate a converted pixel value of the filtering target pixel based on a number of bits representing the first coefficient; and sense a peripheral illumination of the image sensor, wherein, as peripheral illumination decreases, a value of the gain increases, and strength of the one-dimensional Gaussian filter increases.

2. The image sensor of claim 1, wherein the image signal processor is configured to perform the one-dimensional filtering by pixel group units including $M^2$ number of pixels arranged in an M×M matrix (where M is an even number of two or more) and to perform the one-dimensional filtering on each of the $M^2$ pixels on the basis of $M^2$ number of one-dimensional Gaussian filters respectively corresponding to the $M^2$ pixels.

3. The image sensor of claim 1, wherein the plurality of coefficients have a Gaussian distribution, and a value of a first coefficient applied to the filtering target pixel among the plurality of coefficients is largest.

4. The image sensor of claim 1, wherein the image signal processor comprises:

a bad pixel correction logic configured to correct a pixel value of a bad pixel included in the image data; and a noise reduction logic configured to perform the one-dimensional filtering in the first direction and the second direction on the image data based on a plurality of one-dimensional filters to remove noise of the image data.

5. The image sensor of claim 4, wherein the noise reduction logic comprises:

a first filtering module configured to perform one-dimensional filtering in the first direction on the image data on the basis of a first filter; and a second filtering module configured to perform one-dimensional filtering in the second direction on image data on which the one-dimensional filtering in the first direction has been performed, on the basis of a second filter, and the first direction is one of a horizontal direction and a vertical direction of the image data, and the second direction is the other of the horizontal direction and the vertical direction of the image data.

6. The image sensor of claim 4, wherein the noise reduction logic is configured to receive directionality information, representing whether a pixel from the bad pixel correction logic corresponds to an edge region, and to determine whether to skip an operation of performing one-dimensional filtering in the first direction or one-dimensional filtering in the second direction on the pixel on the basis of the directionality information.

7. The image sensor of claim 4, wherein the image signal processor further comprises a remosaic logic configured to convert a pattern of the image data into a Bayer pattern.

8. An image sensor comprising:

a pixel array configured to convert a received optical signal into electrical signals;

a readout circuit configured to analog-digital convert the electrical signals to generate image data; and a noise reduction logic configured to continuously perform one-dimensional filtering in a plurality of directions on the image data based on a one-dimensional Gaussian filter set, wherein the noise reduction logic is configured to perform the one-dimensional filtering on the image data by pixel group units including $M^2$ number of pixels arranged in an M×M matrix (where M is an even number of two or more) on a basis of $M^2$ number of one-dimensional Gaussian filters included in the one-dimensional Gaussian filter set, wherein the noise reduction logic is configured to store a plurality of weights corresponding to each of a plurality of gains and calculate coefficient values of a plurality of coefficients, respectively included in the $M^2$ one-dimensional Gaussian filters, by multiplying reference coefficient values by a weight based on a gain, calculate a converted pixel value of a target pixel based on a number of bits representing the plurality of coefficients, and sense a peripheral illumination of the image sensor, wherein, as peripheral illumination decreases, a value of the gain increases, and strength of the one-dimensional Gaussian filters increases.

9. The image sensor of claim 8, wherein the noise reduction logic is configured to perform one-dimensional filtering in a first direction on the image and to perform one-dimensional filtering in a second direction, the first direction is one of a horizontal and a vertical direction of the image data, and the second direction is the other of the horizontal direction and the vertical direction of the image data.

10. The image sensor of claim 8, wherein the noise reduction logic further comprises a bad pixel correction logic configured to perform bad pixel correction on the image data.

11. An operating method of an image sensor including a signal processing processor, the operating method comprising:

generating image data on the basis of an optical signal received by a pixel array;

performing, by the signal processing processor, one-dimensional filtering in a first direction on the image data on the basis of a first Gaussian filter; and performing, by the signal processing processor, one-dimensional filtering in a second direction on the image data on the basis of a second Gaussian filter, the second direction being different than the first direction;

setting, by the signal processing processor, a plurality of coefficients included in each of the first Gaussian filter and the second Gaussian filter by multiplying a plurality of coefficients by a weight corresponding to a set gain among a plurality of weights, wherein the plurality of weights are preset to correspond to a plurality of gains;

calculating a converted pixel value of a target pixel based on a number of bits representing the plurality of coefficients; and sensing a peripheral illumination of the image sensor, wherein, as peripheral illumination decreases, a value of the gain increases, and strength of the first Gaussian filter and the second Gaussian filter increases.

12. The operating method of claim 11, further comprising performing, by the signal processing processor, bad pixel correction on the image data.

13. The operating method of claim 12, further comprising determining, by the signal processing processor, whether to skip one-dimensional filtering in the first direction and/or one-dimensional filtering in the second direction on the basis of directionality information about a pixel which is generated in the performing of the bad pixel correction.

14. The operating method of claim 11, further comprising, before the one-dimensional filtering in the first direction is performed, performing remosaic processing for converting the image data into image data having a Bayer pattern.

* * * * *